United States Patent
Wasserman et al.

(10) Patent No.: US 7,737,994 B1
(45) Date of Patent: Jun. 15, 2010

(54) LARGE-KERNEL CONVOLUTION USING MULTIPLE INDUSTRY-STANDARD GRAPHICS ACCELERATORS

(75) Inventors: Michael A. Wasserman, Redwood City, CA (US); Ewa M. Kubalska, San Jose, CA (US); Nathaniel David Naegle, Pleasanton, CA (US); Brian D. Emberling, San Mateo, CA (US); Paul R. Ramsey, Tucson, AZ (US); Mark E. Pascual, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 801 days.

(21) Appl. No.: 10/673,088

(22) Filed: Sep. 26, 2003
(Under 37 CFR 1.47)

(51) Int. Cl.
*G06F 15/80* (2006.01)
*G09G 5/00* (2006.01)
*G06K 9/64* (2006.01)

(52) U.S. Cl. ............... 345/615; 345/505; 345/643; 382/279

(58) Field of Classification Search ......... 345/501, 345/502, 505, 506, 520, 545, 643, 629, 630, 345/615; 382/303, 304, 279
See application file for complete search history.

(56) References Cited

U.S. PATENT DOCUMENTS

| | | | | |
|---|---|---|---|---|
| 4,947,446 A | * | 8/1990 | Jutand et al. | 382/304 |
| 5,129,092 A | * | 7/1992 | Wilson | 382/304 |
| 5,524,075 A | * | 6/1996 | Rousseau et al. | 382/302 |
| 6,417,861 B1 | * | 7/2002 | Deering et al. | 345/589 |
| 6,424,453 B1 | | 7/2002 | Zanger et al. | |
| 6,819,337 B2 | | 11/2004 | Naegle | |
| 2002/0033828 A1 | | 3/2002 | Deering et al. | |
| 2004/0004620 A1 | * | 1/2004 | Inada et al. | 345/501 |

OTHER PUBLICATIONS

U.S. Appl. No. 10/989,599, filed Nov. 16, 2004, Wasserman et al.
U.S. Appl. No. 09/894,617, filed Jun. 27, 2001, Deering et al.
U.S. Appl. No. 10/673,087, filed Sep. 26, 2003, Wasserman et al.

* cited by examiner

*Primary Examiner*—Hau H Nguyen
(74) *Attorney, Agent, or Firm*—Meyertons Hood Kivlin Kowert & Goetzel, P.C.; Jeffrey C. Hood

(57) ABSTRACT

A multi-chip system and method are disclosed that utilizes a plurality of graphics pipelines to perform large kernel convolution. Each graphics pipeline includes a standard rendering unit and a video data convolve unit. Each video data convolve unit receives video pixel data from the video output of the standard rendering unit. The video data convolve units are connected in a chain. Each group of one or more video data convolve units in the chain convolves the video pixel data received by the group. The last video data convolve unit in the chain outputs a stream of convolved pixels.

4 Claims, 18 Drawing Sheets

Convolution Kernel

| 0 | 1 | 2 | 3 | 0 | 1 | 2 | 3 |
|---|---|---|---|---|---|---|---|
| 4 | 5 | 6 | 7 | 4 | 5 | 6 | 7 |
| 8 | 9 | A | B | 8 | 9 | A | B |
| C | D | E | F | C | D | E | F |
| 0 | 1 | 2 | 3 | 0 | 1 | 2 | 3 |
| 4 | 5 | 6 | 7 | 4 | 5 | 6 | 7 |
| 8 | 9 | A | B | 8 | 9 | A | B |
| C | D | E | F | C | D | E | F |

Interleave Pattern

*FIG. 7*

Interleave Within Group A
Sample Bin Assignments to the Group A Sample Managers numbered 0, 1, 2 and 3

Group Interleave

LARGE-KERNEL CONVOLUTION USING MULTIPLE INDUSTRY-STANDARD GRAPHICS ACCELERATORS

BACKGROUND OF THE INVENTION

1. Field of the Invention

This invention relates generally to the field of computer graphics and, more particularly, to a high performance graphics system.

2. Description of the Related Art

There exist high performance graphics systems that perform super-sampling. For every pixel seen on the screen, more than one sample is generated and stored in memory. Prior to display on screen, a set of samples is convolved (or filtered) to produce a single color for a corresponding pixel. Filtering may be performed using a variety of methods, but typically involves generating a weighted average of a set of samples that are within a defined region of sample space called a kernel that corresponds to a pixel location. In high performance graphics systems this process is accomplished with a complicated set of custom chips. Designing and developing a set of these custom chips is expensive and requires significant man-hours. A design that utilizes a set of existing standard graphics boards (without super-sampling or multi-sampling capability) to achieve a high performance graphics system may offer a significant improvement in the development cycle.

SUMMARY

A multi-chip system and method are disclosed that utilizes a plurality of graphics pipelines to perform large kernel convolution. Each graphics pipeline includes a standard rendering unit and a video data convolve unit. Each video data convolve unit receives video pixel data from the video output of the standard rendering unit. The video data convolve units are connected in a chain. Each group of one or more video data convolve units in the chain convolves the video pixel data received by the group. The last video data convolve unit in the chain outputs a stream of convolved pixels. The possible systems include a stacked topology, a tiled topology, and a combination of stacked and tiled topologies.

In some embodiments, a system for distributed convolution of digital video data utilizing a stacked topology may include N graphics pipelines. Each geometric primitive is sent to every graphics pipeline. Each rendering unit is assigned a different jitter value (or a different jitter pattern for a rendering unit with sufficient memory). Each rendering unit generates a video pixel for the location of each screen pixel (plus the assigned jitter value). Each video data convolve unit is connected to a dedicated rendering unit and the N video data convolve units may act together to perform a distributed convolution on the video pixels received from the N rendering units. Consequently, the N rendering units provide N different video pixels per each convolved video pixel location. This is equivalent to a process that generates N samples per sample bin and convolves a pixel from a set of samples contained within a corresponding convolution kernel.

A system for distributed convolution of stacked digital video data may include one or more of: 1) a plurality of rendering units; 2) a plurality of video data convolve units connected in a chain, where each video data convolve unit is connected to a video output of a dedicated rendering unit; 3) one or more partial results buses, where each bus connects a video data convolve unit in the chain to a next video data convolve unit in the chain; and (in some embodiments) 4) an interface between the dedicated graphics rendering unit and the video data convolve unit to convert the format of the video pixel data to a digital data format utilized by the video data convolve unit.

Each video data convolve unit may include one or more of: 1) a video line buffer to store lines of video pixels received from the video output of the rendering unit, 2) a convolution calculation unit to calculate partial convolution sums for a set of the video pixels that are located within a convolution kernel, 3) a partial results accumulator to receive accumulated partial convolution sums (also referred to as partial results) from a prior video data convolve unit in the chain (unless the video data convolve unit is the first video data convolve unit in the chain), add the calculated partial convolution sums to corresponding partial sums received, and output the new accumulated partial convolution sums to the next video data convolve unit in the chain (unless the video data convolve unit is the last video data convolve unit in the chain), 4) a pixel value calculator that is operable in the last video data convolve unit in the chain to determine values for a convolved pixel from the final accumulated partial sums, and 5) a video blend unit that is operable in the last video data convolve unit in the chain to output convolved pixels.

Partial convolution sums include 1) a sum of weights determined for locations of each video pixel in the set of video pixels and 2) a sum of weighted video pixel values for the set of video pixels. There is a set of partial convolution sums for each parameter value specified for each pixel (such as the color values red, green, and blue). The value for each convolved pixel parameter equals the sum of weighted video pixel values for the parameter divided by the sum of weights.

In single-sample mode multi-sampling each rendering unit is configured to render one sample per sample bin. In multi-sample mode multi-sampling expanded primitives are rendered to achieve multiple samples per sample bin per rendering unit, utilizing rendering units configured to render one sample per sample bin. The primitives are expanded by equal integer factors in both the x and y dimensions. This method may generate 4, 9, 16, ... m*m samples per sample bin, where m is the expansion factor. The video data convolve units in these embodiments are configured to reduce the location values by the expansion factor as part of the convolution process to achieve, the original intended geometry of the rendered image.

In other embodiments, a system for convolution of digital video data utilizing a tiled topology may also include N graphics pipelines. Each graphics pipeline, however, may be assigned a different portion of screen space and process those geometric primitives (or clipped geometric primitives) that reside within the assigned portion. Frustum culling may be utilized to sort the geometric primitives by screen portions and send each primitive to the corresponding pipeline. Those primitives that overlap a screen portion boundary may be sent to both portions or subdivided along the boundary. Each rendering unit generates a video pixel for each screen pixel location within the assigned portion. Each video data convolve unit is connected to a video output of a rendering unit and convolves the video data it receives into convolved pixels. The video data convolve units may be chained together by partial video buses.

In still other embodiments, a system for convolution of digital video data utilizing a combination of stacked and tiled topology may also include N graphics pipelines. The graphics pipelines may be organized into groups. At least one group may have a plurality of pipelines, while remaining groups may include one or more pipelines. For groups with more than one pipeline, the pipelines within the group utilize a stacked topology and distributed convolution. The groups are interconnected with a tiled topology. Each group may be assigned a portion of screen space and may process geometric primitives (or clipped geometric primitives) that reside within the assigned portion. Frustum culling may be utilized to sort the geometric primitives by screen portions and send each primitive to the corresponding pipeline. Those primitives that overlap a screen portion boundary may be sent to both portions or subdivided along the boundary. Each pipeline within a group receives the same geometric primitives. Each rendering unit within a group is assigned a different jitter value. The video data convolve units within a group perform a distributed convolution on the video pixels received from their dedicated rendering units. Consequently, each group with two or more pipelines generates a plurality of jittered video pixels for each screen pixel location within the assigned portion of screen space.

BRIEF DESCRIPTION OF THE DRAWINGS

A better understanding of the present invention can be obtained when the following detailed description is considered in conjunction with the following drawings, in which:

FIG. 7 illustrates a 5 by 5 filter kernel superimposed over an 8 by 8 array of sample bins and the interleaved Sample Manager assignments;

FIG. 8 shows a set of sample bins and an assigned Sample Manager for each bin for an interleaved system with four groups of four Sample Managers;

Figure 1:
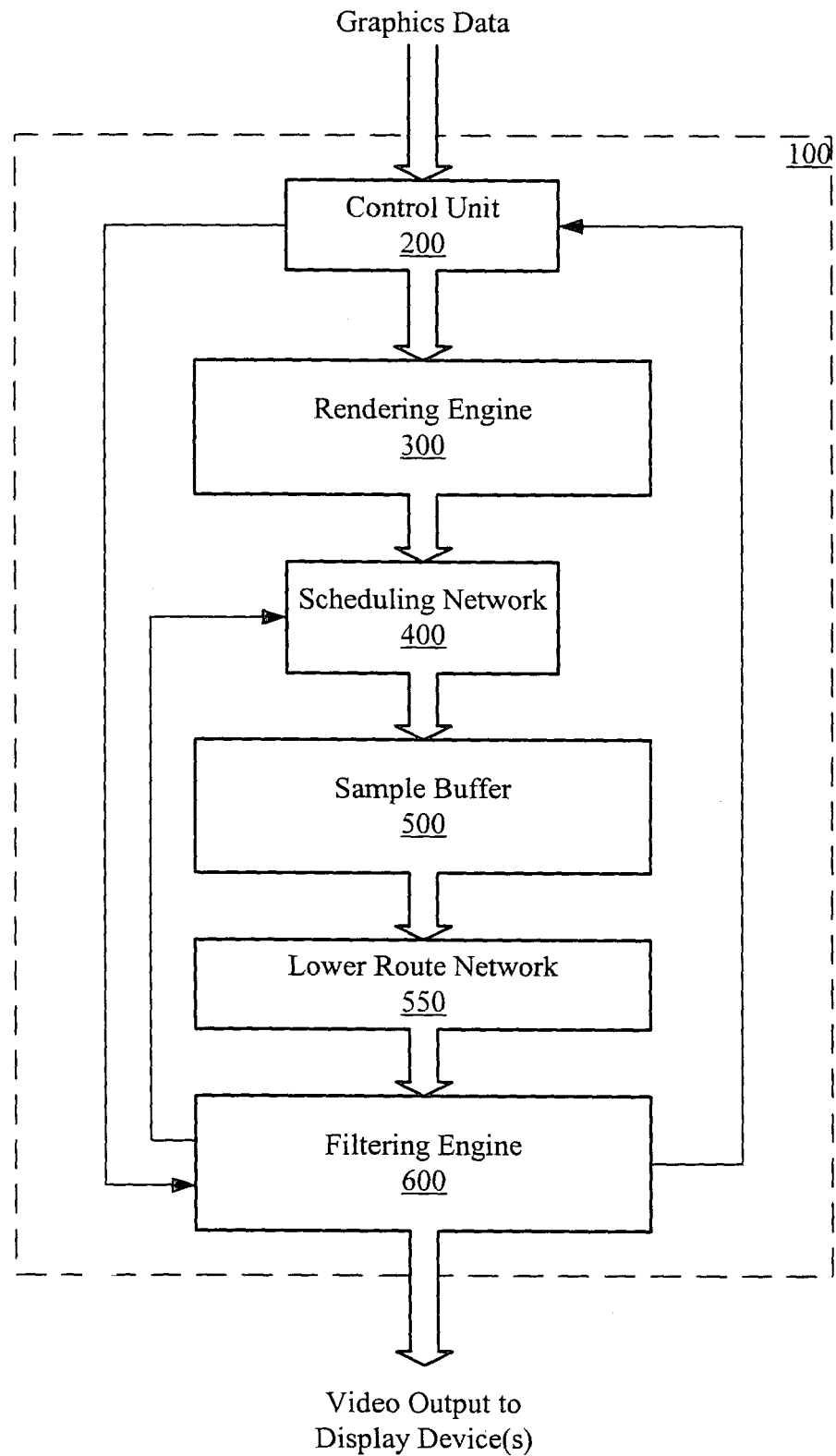
FIG. 1 provides a block diagram of one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

A sample filtering system is described that may reduce board routing by eliminating crossbars, reduce the number of ASICs to be developed, and increase the fill rate by building a wider interface to sample buffer memory (interleaved over multiple chips).

Sample Manager ASIC

Figure 2:
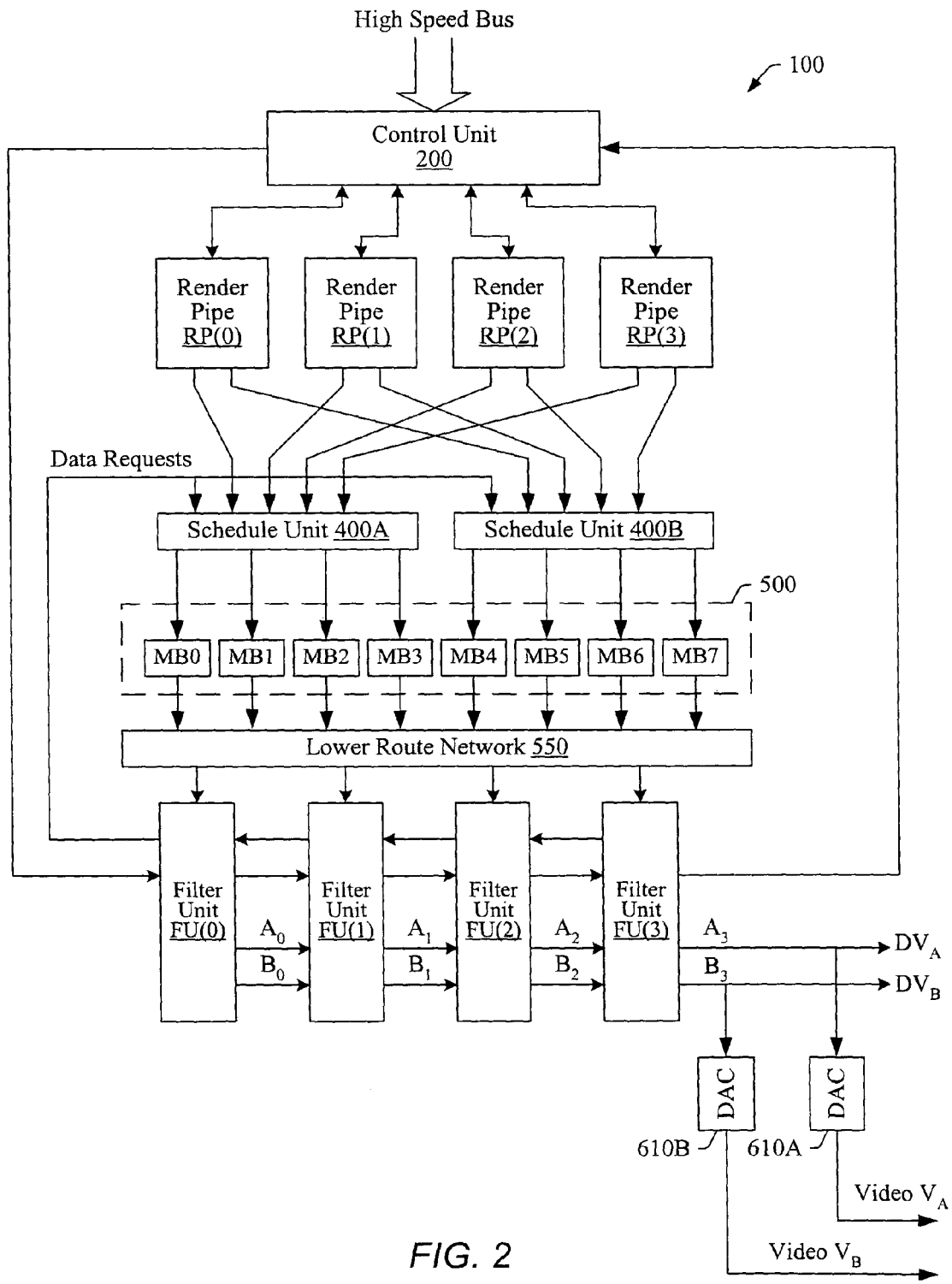
FIG. 2 provides additional details for one set of embodiments of a graphics accelerator configured to perform graphical computations.

A graphics accelerator system may be configured according to a multiple crossbar architecture as suggested by FIGS. 1 and 2. The crossbar architecture includes three sets of ASICs: a scheduling network 400 (i.e., a set of Sched ASICs), a lower route network 550, and a filtering engine 600 (i.e., a set of Convolve ASICs also referred to as filter units FU(K)).

Please refer to U.S. patent application Ser. No. 09/251,453, filed on Feb. 17, 1999, entitled "A Graphics System with Programmable Real-Time Sample Filtering", invented by Deering, Naegle and Nelson, for more information on various embodiments of a graphics accelerator system utilizing a crossbar architecture. This patent application is hereby incorporated by reference in its entirety.

Figure 3:
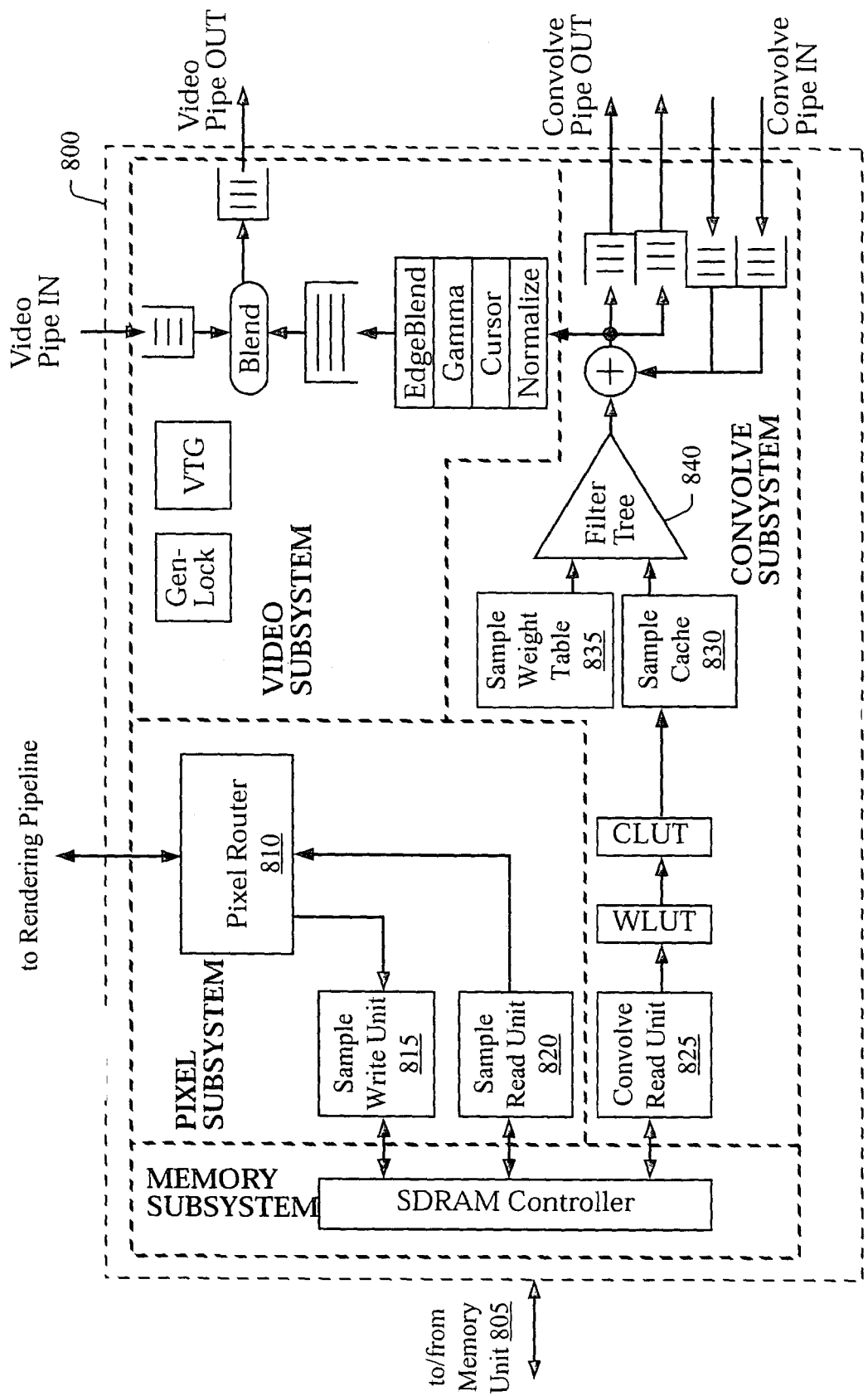
FIG. 3 provides a block diagram of one set of embodiments of a Sample Manager ASIC capable of distributed convolution of sample values to pixel values.
Figure 4:
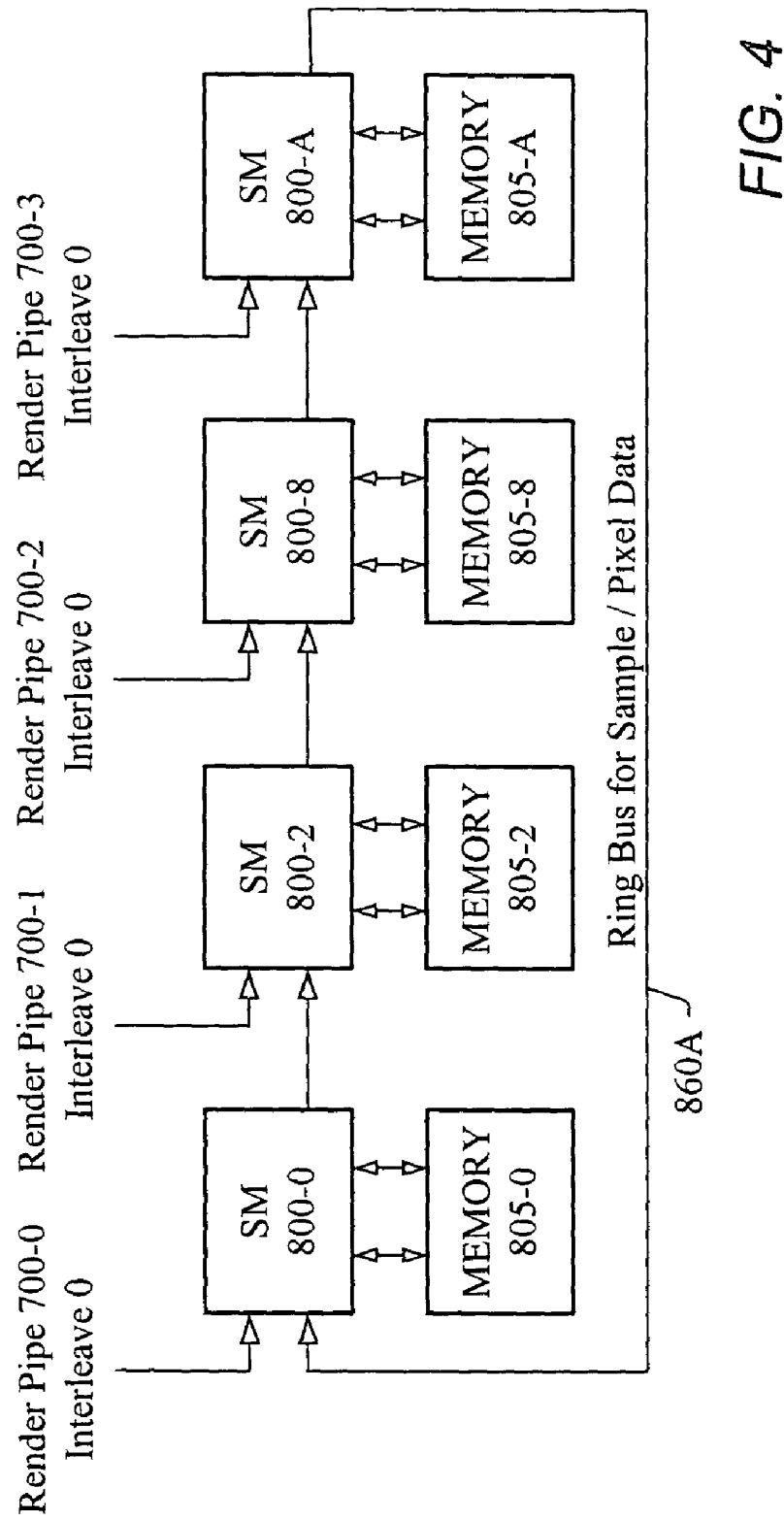
FIG. 4 provides a block diagram of one set of embodiments of a set of Sample Manager ASICs and a ring bus for sample/pixel data for one interleave.
Figure 6:
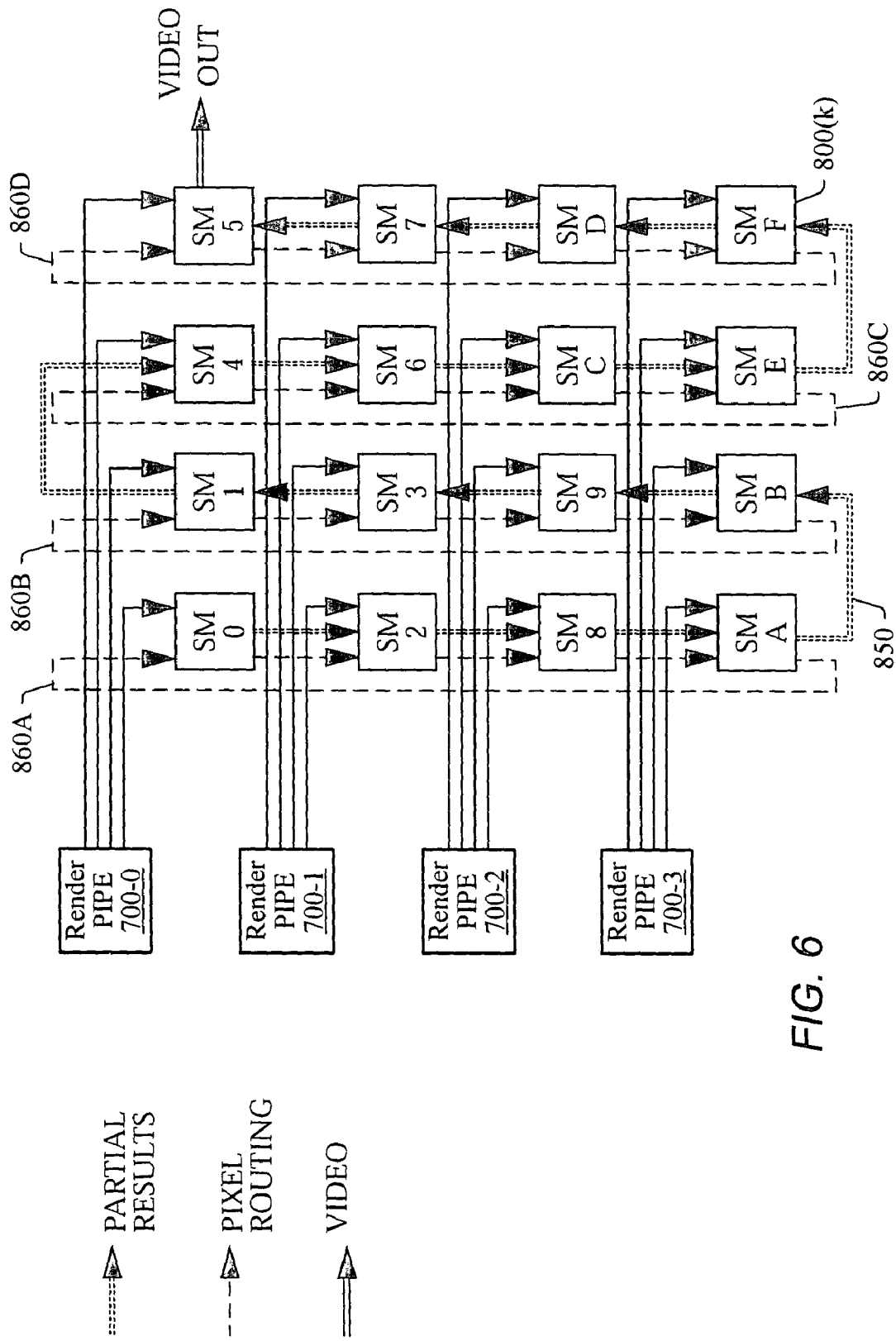
FIG. 6 illustrates a first interconnection topology for a system of 16 Sample Manager ASICs.

In an alternative architecture, the three sets of ASICs may be replaced with one set of ASICs referred to herein as sample managers 800. The sample managers 800 provide the functionality of the three sets of ASICs. Each sample manager (also referred to herein as SM) includes four subsystems: Memory, Pixel, Convolve, and Video. These subsystems are delineated for some embodiments, in the block diagram shown in FIG. 3. The sample managers may utilize a ring routing approach (as shown in FIGS. 4 and 6), which may also reduce the complexity of board layout.

The crossbar architecture (shown in FIGS. 1 and 2) may use Sched ASICs 400 and Lower Route ASICs 550 to serve as crossbar switches around the sample buffer 500. Sched ASICs 400 give each of the rendering pipes 300 access to the entire sample buffer 500. Lower Route ASICs 550 give each of the Convolve ASICs 600 access to the entire sample buffer 500. Each rendering pipe RP may rasterize triangles into 2×2 pixel tiles (A 2×2 pixel tile may also be referred to as a 2 by 2 array of sample bins). Within each of these pixels, up to 16 sub-pixel samples may be generated. Each RP generates four sample outputs each cycle, one per interleave. Based on an interleave number, the sample is routed to the appropriate Sched ASIC 400, which routes the sample to one of a plurality of memory chips in the sample buffer 500. Note that the interleaving of a sample address may not be directly related with the interleave of the pixel address (which contains those samples). This results in the samples for a particular pixel (often called a bin or sample bin) being spread out among the various memory chips.

On the convolve side (i.e., the filtering side) of the sample buffer 500, Lower Route network 550 provides a path between each group of memory chips and each of the Convolve ASICs 600. Each of the Convolve ASICs 600 may be responsible for generating video pixels for a portion of the screen and to do so will request the samples required to generate those pixels. Due to the interleaving of samples, those samples may be spread across the entire sample buffer 500. In some embodiments, the sample buffer 500 may include 64 memory chips. Each memory bank (such as MB0) may include 8 memory chips.

Figure 5:
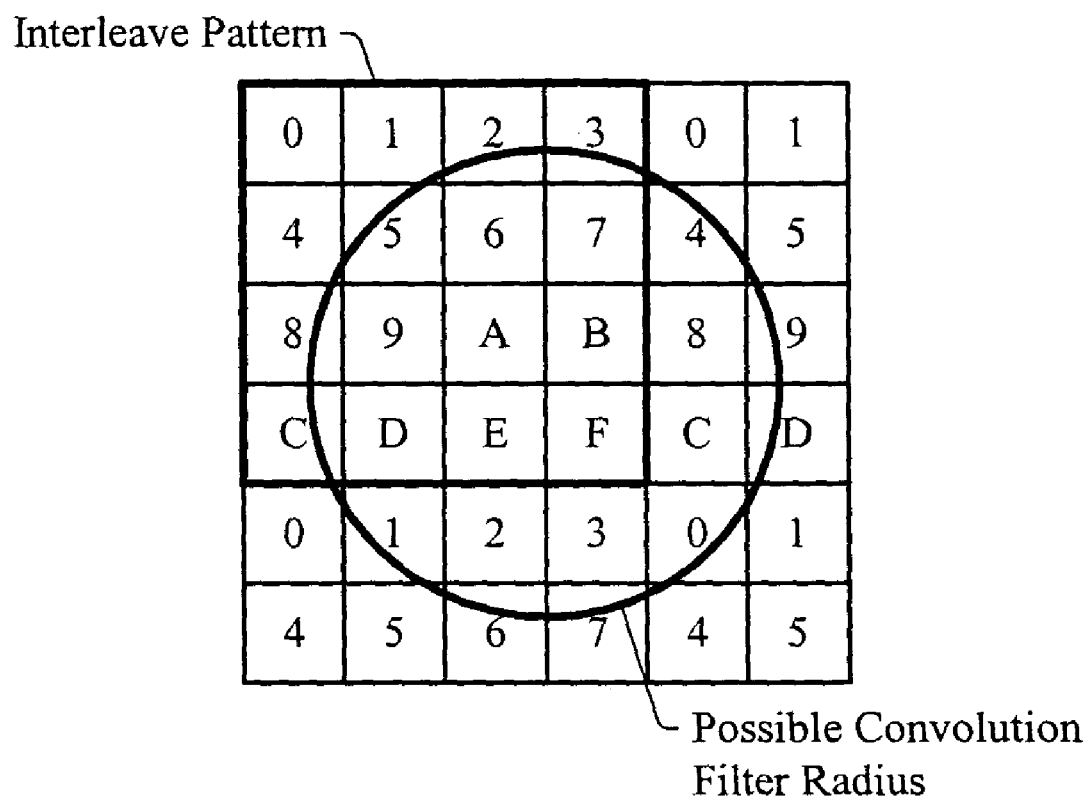
FIG. 5 shows a set of sample bins and an assigned Sample Manager for each bin for an interleaved system with 16 Sample Managers.

The new topology replaces the Sched, Convolve, and LowerRoute ASICs with a set of sample manager ASICs 800, each directly connected to a dedicated memory. The sample buffer 500 is to be interpreted as the union of the attached memories. For a system with four rendering pipelines, sixteen SMs 800 may be used, each with its own memory. The 16 SMs 800 may be interleaved according to a 4×4 grid in pixel (screen) space as shown in FIG. 5. The 4×4 grid may be further divided into four groups of four based on the low-order bits of the screen address. These groups are directly correlated to the 2×2 interleaves of the rendering pipeline output. Each rendering pipeline output interleave may be mapped directly to a group of four SM ASICs 800.

Within each group, the four SMs are connected in a ring. Each chip receives an input from one of the four rendering pipes (RP). In addition, it receives sample data from the previous chip in the ring, and sends sample data to the next chip in the ring. FIG. 4 shows the interconnection of the four sample manager ASICs 800 dedicated to Interleave 0. This structure may be replicated for the three remaining interleaves. Each RP may access any portion of the sample buffer 500, and the memory may be interleaved in a 2×2 pattern. This structure may achieve a decrease in board complexity at the expense of some latency. The samples for a particular pixel are not spread out among the various memories of the sample buffer 500. Rather, the memory chips are interleaved in screen-space. The samples within a particular pixel are stored in the same memory chip (also referred to as simply RAM). This permits deferring multi-sample expansion until after the RP-SM interface. This may allow an increased fill rate in cases where the SM-memory interface is faster than the RP-SM interface. A custom RAM may offer significant benefits for fill-rate since the internal interfaces may be faster.

A major difference from the crossbar architecture appears when convolution of samples into video pixels is considered. In the crossbar architecture, samples "belong" to the sample buffer, and LowerRoute allows each Convolve ASICs equal access to the entire sample buffer. In the new topology, each SampleManager ASIC 800 "owns" a portion of the sample buffer 500. Since the SMs may be finely interleaved, each of the SMs may contribute to a filtered pixel. FIG. 5 shows a circular filter support of radius 2.5 superimposed on a map of a 16 SM system. Each of the SMs contributes samples from one or more bins to the final filtered sum.

The SM ASICs 800 may also be chained together via a "partial results" bus as shown in FIG. 6. Each SM weights the samples within its own memory. These weighted samples are summed, along with the sum of the sample weights. These "partial results" are added to the partial results from the previous SM and the sum is passed onto the next SM in the chain. The final SM normalizes the sums and outputs the filtered video pixel. A video bus may be used to provide board-to-board connectivity as suggested in FIG. 6 by the pathway labeled "video out".

Sample Manager Subsystems

The sample manager 800 may include four subsystems: Memory, Pixel, Convolve, and Video. These subsystems are delineated (for some embodiments) in the block diagram shown in FIG. 3.

Memory Subsystem

In some embodiments, standard SDRAM (synchronous dynamic RAM) memory technology may be used. In other embodiments, a next-generation 3D-RAM memory may allow some processing features to be embedded into the RAM, which may result in higher performance.

Pixel Subsystem

The pixel subsystem is responsible for writing (or reading) sample data to (or from) a dedicated local memory unit 805. In some embodiments, the Pixel Router 810 selects samples that are located in a portion of sample space assigned to the sample manager and stores the selected samples in the dedicated local memory unit 805. The Pixel Router 810 transfers samples that are not located in the portion of sample space assigned to the sample manager to another SM 800 via a ring bus that connects a plurality of SMs in a ring. Since the SMs may be assigned screen space regions that are interleaved in a regular pattern, it suffices in these cases to decode the lower bits of any sample address (X,Y) to determine which SM is the destination of that pixel. Samples that lie outside of the SM's assigned screen space region are passed on the ring output. Samples that lie inside of the SM's assigned screen space region are stored in the SM's memory.

The Pixel Router 810 is also responsible for maintaining order when in ordered mode. Depending on the topology chosen, ordered mode is maintained in different ways. In standard topology ordering is maintained through the use of tokens and FIFOS. Pixels are first sorted by their source (which RP the pixel was generated from) and placed in an appropriate FIFO. In unordered mode, data is taken out of the FIFOs in a round-robin fashion. Thus, data from all sources may be evenly handled. In ordered mode, data is taken from only one FIFO at a time, thus taking data from one rasterizer in order. When switching to the next rasterizer, a token may be sent down each of the pipes, indicating the next rasterizer to generate pixels. When the tokens reach the bottom of the FIFOs, the Pixel Router may switch to the appropriate next FIFO. In tiled screen topology, pixel routing may not be required since pixels are directly mapped to a particular SM ASIC. One alternative embodiment utilizes a combination between the standard topology and the tiled screen topology. Standard topology would be used for unordered mode, and tiled screen topology would be used for ordered mode. In this case, the pixel routing would be disabled upon entering ordered mode.

The SM's Pixel Write Unit 815 receives samples from the RPs as input. The Pixel Write Unit 815 is responsible for outputting samples to the memory subsystem (and ultimately the memory 805). Two possible sample generation modes are "super-sampling" and "multi-sampling." When "super-sampling," the RP evaluates color, texture, and z value for each sample and passes the sample to the SM 800. The SM 800 passes the data directly into the memory 805. This allows "texture per sample" and "color per sample" operation.

When multi-sampling, color (including texture) is evaluated for one sample per pixel, and the SM 800 expands the parameter set for the one sample into multiple samples per pixel using a sample mask and z slopes (partial derivatives of z with respect to sub-pixel x and y). For each pixel, a RP will send a parameter set for one sample including color, z value, z slopes, and a sample mask. Within the SM, the samples will be expanded and individually written to the memory 805. Sample expansion may be accomplished by replicating color values across multiple samples and interpolating z for each of the locations of the multiple samples from a z value for the one sample and slopes for the rate of change of z within the pixel. A plurality of Z interpolators may be utilized and have knowledge of the jitter tables that define each sample's location (sub-pixel x and y). A sample mask indicates which of the potential sub-pixel locations are enabled, and those samples may be expanded. Alternatively, the plurality of interpolators may be shared among more than one pixel to get better utilization on triangle edges where less samples will be filled. The samples are tested against the Z cache and they may be sent to a blend unit. The samples are then sent to the memory 805. Data reduction or compression techniques may be used to reduce the amount of data per pixel. For example, since Z-Slopes are constant across a triangle, they may only be sent once per triangle.

There are a number of opportunities for caching in this architecture. A hierarchical Z cache may be used, perhaps storing nearest and farthest Z for blocks of pixels. Similarly, some information may be stored about the depths of the samples within a pixel, to reduce the number of reads of the Z buffer. A pixel (sample) buffer, may also be used. The pixel buffer may hold on to the last several pixels accessed. Across a surface, a pixel that is not completely covered by one triangle (i.e. has an edge going through it), will likely be accessed soon by another triangle that will cover some of the remaining samples.

Blend units may be used to perform sorting for arbitrary order transparency. These blend units may be programmable (or partially programmable).

Samples can be read from the memory 805 in several ways:
1. Single Sample Readback: a single sample per pixel may be read and returned or a specified number of multiple reads may be performed.
2. Full Pixel Readback: a set of samples corresponding to a pixel may be read back and returned.
3. Box Filtered Pixel Readback: a set of samples corresponding to a pixel may be read out of the sample buffer and the samples averaged using a box filter. The filtered result is returned.
4. Convolved Filtered Pixel Readback: some of the convolution hardware may be replicated for readback. Based on a table of filter weights, the SM 800 filters the samples it owns. The partial sums are returned, which include a partial sum of weighted sample values and a partial sum of the weights.

Convolve Subsystem

The Convolve Subsystem requests samples from the memory 805 and filters the samples into pixels. However, unlike prior systems, convolution (or filtering) is distributed. Each SM 800 calculates partial sums for the samples from its memory 805, adds the partial sums to the accumulated partial sums from the previous SM, and passes the new accumulated partial sums to the next SM. The last SM in the chain of SMs sends the accumulated sums to the Video subsystem for calculation of pixel values from the accumulated partial sums (see FIG. 3 and FIG. 6).

The 5×5 pixel neighborhood containing the convolution kernel has significant reuse of samples. Rather than re-fetching the data from memory, each time, the Sample Cache is responsible for holding the samples that are reused for convolution. FIG. 7 shows how a 5×5 filter kernel maps onto the 4×4 bin interleaves of the SMs. Each box in FIG. 7 represents a pixel bin. These bins contain some number of samples corresponding to a sample density selected or programmed. For standard video formats (not resized), the kernel moves across the sample space at the rate of one bin per pixel clock. However, due to the interleaving, a new pixel bin is required by each SM only once every four pixel clocks, and the kernel includes no more than two bins from any interleave. Similarly, in the Y direction, the kernel moves through the sample space at one line per line time. A new line is required only once every four line times, and the kernel includes no more than two lines from any interleave.

The 5×5 kernel may include from 1 to 4 bins from any SM interleave. At most, two bins from any one line will be included at one time. Given two line buffers, each line buffer provides access to two bins at once. Each line buffer need not provide two read ports. In fact, since the data is accessed in raster order, significantly less bandwidth is needed. Once accessed from the line buffer, a sample is used five times before being retired, and a new sample is needed every four convolve clocks. If register storage for two pixel bins is provided, access to the memory may be needed only once every four pixelclocks to fetch the next bin. This allows a denser memory usage, reducing the area of the line buffers. It should be noted that only one of 16 SMs will use this peak rate at a time. But once the hardware supports this rate, the filtering kernel could be expanded to 8×8 (as shown in FIGS. 1 through 10) without increasing the requirements for the filter cache.

A table of filter weights may be stored in a cache, such as Sample Weight Table 835. For any given pixel being filtered, up to four bins may be accessed (1, 2, and 4 are possible). If, rather than "just in time" lookups, a small FIFO is provided to store the lookups, the load may be averaged out. Four lookups are required, only once every four pixels; the remaining three pixels may require only three lookups. The bandwidth may be further reduced by averaging over the full line-time.

Video Subsystem

In some embodiments each SM 800 may support two video streams. Each SM has its own video subsystem, though most may be unused, and only one used for each video stream. With the exception of the sample cache, convolution resources may be shared among multiple video streams. This may even include the partial results bus. Supporting two video streams can be accomplished by either dedicating two partial results buses, or by sharing the partial results bus. In either case, the last SM in each chain may be designated to output the video pixels. In one embodiment, the system supports one video stream for every SM 800, by sharing the partial results bus (or buses).

The normalization section is responsible for computing the final filtered pixel values from the weighted sums of samples. The output of the convolution subsystem is four weighted sums of samples (R,G,B,A) and a sum of the weights. Normalization may include a division (or a reciprocal and multiply operation). Edge blend may be performed by a table lookup. Once pixels are processed they may be pushed into a Local Video Fifo. Pixels may be read out of this FIFO at the video pixel clock rate. Logic below this FIFO may run on the video pixel clock.

Please refer to the following patent applications for more information on how to make and use a scalable series of video routers to incrementally accumulate a set of one or more video streams:

(a) U.S. patent application Ser. No. 09/894,617, filed on Jun. 27, 2001, entitled "Flexible Video Architecture for Generating Video Streams", invented by Deering and Naegle;

(b) U.S. patent application Ser. No. 10/195,857, filed on Jul. 15, 2002, entitled "Initializing a Series of Video Routers that Employ Source-Synchronous Signaling", invented by Nathaniel David Naegle.

These applications are hereby incorporated by reference in their entireties.

Convolution Areas

A convolution area is the region in sample space assigned to a chain of SMs. In the standard configuration, 16 SMs cover a single convolution area. The system may support two video streams for each convolution area. If more video streams are required, the capability of the system may be increased by dividing the sample space into multiple convolution areas. Each SM may be dedicated to a single convolution area. If the 2×2 interleaving is maintained, each RP retains access to the entire sample buffer. Convolution areas may have the following properties:

1. Two video streams may be supported from each convolution area.
2. Any RP may render to any convolution area.
3. Rendering to a particular area approaches the full geometry rate of the system, but only 1/Nth the fill rate (for N areas).
4. When supporting more than one convolution area, each SM is responsible for more bins within the 5×5 kernel. Therefore, the resource requirements for convolution will be higher, and for a fixed number of SMs the maximum video resolution will be decreased.

Given a system with 4 RPs and 16 SMs, in which the 16 SMs are divided into four convolution areas, the system might be reconfigured as four independent systems. Each of these systems may have a geometry rate approaching 100 M triangles/sec, and a fill rate approaching 8 G samples/sec, and support 2 streams of video. This may be a way of using an SM-based system as a graphics server.

Alternate Topology

Since each RP may be responsible for particular portions of the screen, sample manager topology may be simplified by interleaving the SMs in the same fashion. Each RP may be attached to a group of four SMs. 16 SMs may be numbered such that the lower two bits indicate the interleave within the group, and the upper two bits indicate the group number. FIG. 8 shows the interleaving of the SMs.

This topology allows a reduction in the bandwidth requirement for the partial results bus. This can be done because most of the pixels on the screen will only require samples from a single group. Therefore, partial results will flow through fewer SMs, reducing the overall bandwidth requirement. As the 5×5 kernel moves across the screen, its center will fall within exactly one group (e.g., a 16×16 block). Partial results will flow through and towards that group. The last SM in the target group's chain normalizes the sum and places the filtered pixel in its video FIFO.

Figure 9:
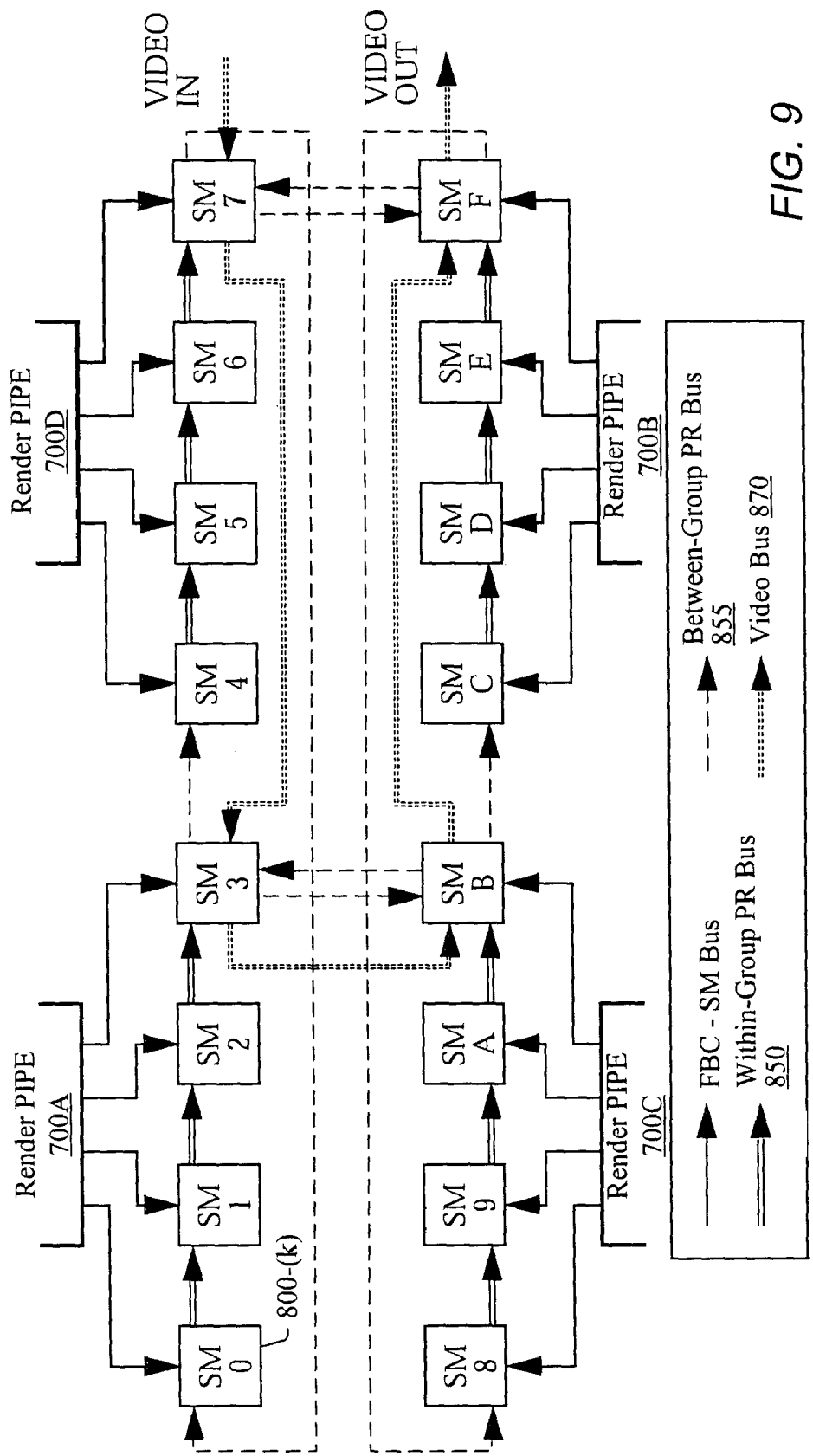
FIG. 9 illustrates a second interconnection topology for a system of 16 Sample Manager ASICs.

Because of the coarser interleaving of blocks of sample bins (e.g., 16×16 arrays) most of the samples for a pixel will exist within the same group as the destination video FIFO. As such, the partial results need only flow through the chips for that block. Since each block is responsible for ¼ of every line, the net result is that the partial results bus may need about ¼ of the bandwidth of the original system. This bus is the Within-Group Partial Results Bus (or WG bus). For the pixels around the edges of the blocks, additional groups may be used to contribute partial results to the final pixel. Therefore, a bus for communicating partial results between groups may be provided. These buses are known as the Between-Groups Partial Results Buses (or BG buses). The last SM in each group contains the video FIFO for that group. The video bus flows through each of these "last" SMs to complete the video. FIG. 9 shows the connection of the various buses. Additional boards may be connected in the video chain.

Each SM knows the number of its group, and the SMs in a group act in a consistent manner. For any pixel on the screen (i.e. any convolution kernel center), the SMs in a group will classify it in one of three ways:

1. Local Pixel—This pixel lies within the group's region. The final result will end up in the group's video FIFO.
2. Adjacent Pixel—This pixel lies outside of the group's region, but is within the convolution kernel radius of the group's region's border. A partial result is generated and passed on to the group for which this pixel is a local pixel.
3. Idle Pixel—This pixel is outside of the group's region and further than a convolution kernel radius from the group's region's border.

Figure 10:
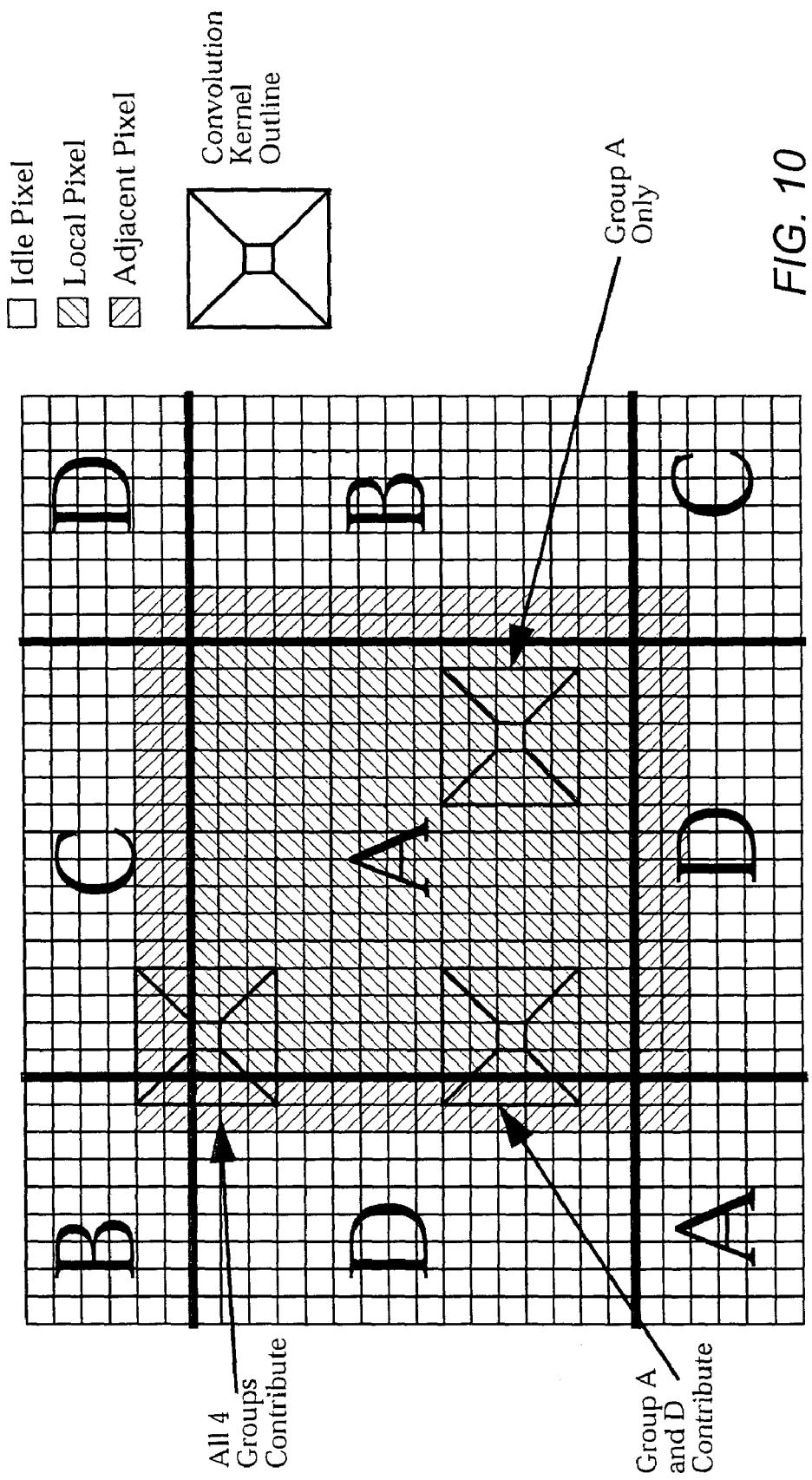
FIG. 10 illustrates three possible types of filter kernel locations for a system of four groups of four Sample Managers.

FIG. 10 shows the classification of pixels for Group A for a region of the screen, as well as three example convolution kernel outlines. These examples show the possibility of one, two, or four groups contributing to a video pixel. When multiple groups contribute to the final pixel result, it is possible for either two or four groups to work together. The BG buses are used to allow partial results to flow between groups. The buses are set up so that partial convolution results data does not have to flow between groups which do not contribute to the final result. Groups may calculate partial results in series (the output of one group flows into the beginning of the next group's chain) or parallel (both groups calculate their partial results, and the ends of the chains are joined). When the four groups combine for a single result, the operation is completed as a parallel combination of two series combinations.

To support a single video stream, each SM supports a ring connection (one input and one output) for video. All SMs may have this ring bus. However, only every fourth SM may be connected to the video ring. In addition, each SM may have two ring connections (i.e two inputs and two outputs) for partial results. One of these rings (a serial ring) supports the Within-Group Partial Results Bus. In addition, the same ring is used to carry a portion of the Between-Group Partial Results buses. The second ring (a parallel ring) may be used for Between-Group connectivity. These connections are shown in FIG. 9.

Additional video streams (up to a total of 4) may be supported by adding additional serial rings. The second channel would be supported by a second serial ring. The ring may run in the opposite direction (though any ordering works as long as a different SM is the last in the chain for any video channel). Whichever SMs are last in their respective group's chain, will be connected via the video bus and the parallel ring.

Since these rings (video and parallel) already exist but are unused, it suffices to add the additional serial ring to make use of them.

In one embodiment, the SM may support very high speed monitors and projectors. The SM may support a mode by which the two channels can be set up to generate even and odd pixels, respectively. The two streams will be genlocked together and the resulting pixels will be output per normal operation.

In other embodiments, filter logic may be placed in the RPs. Each SM may send its partial results for the particular pixel up to a RP. The RP may then do the final normalization. In this case, 144 of 256 pixels would require no partial results. Of the remaining 112 pixels, 96 require partials from one neighbor and 16 require partials from all four groups.

Distributed Convolution (Chain of Sample Managers)

Figure 11:
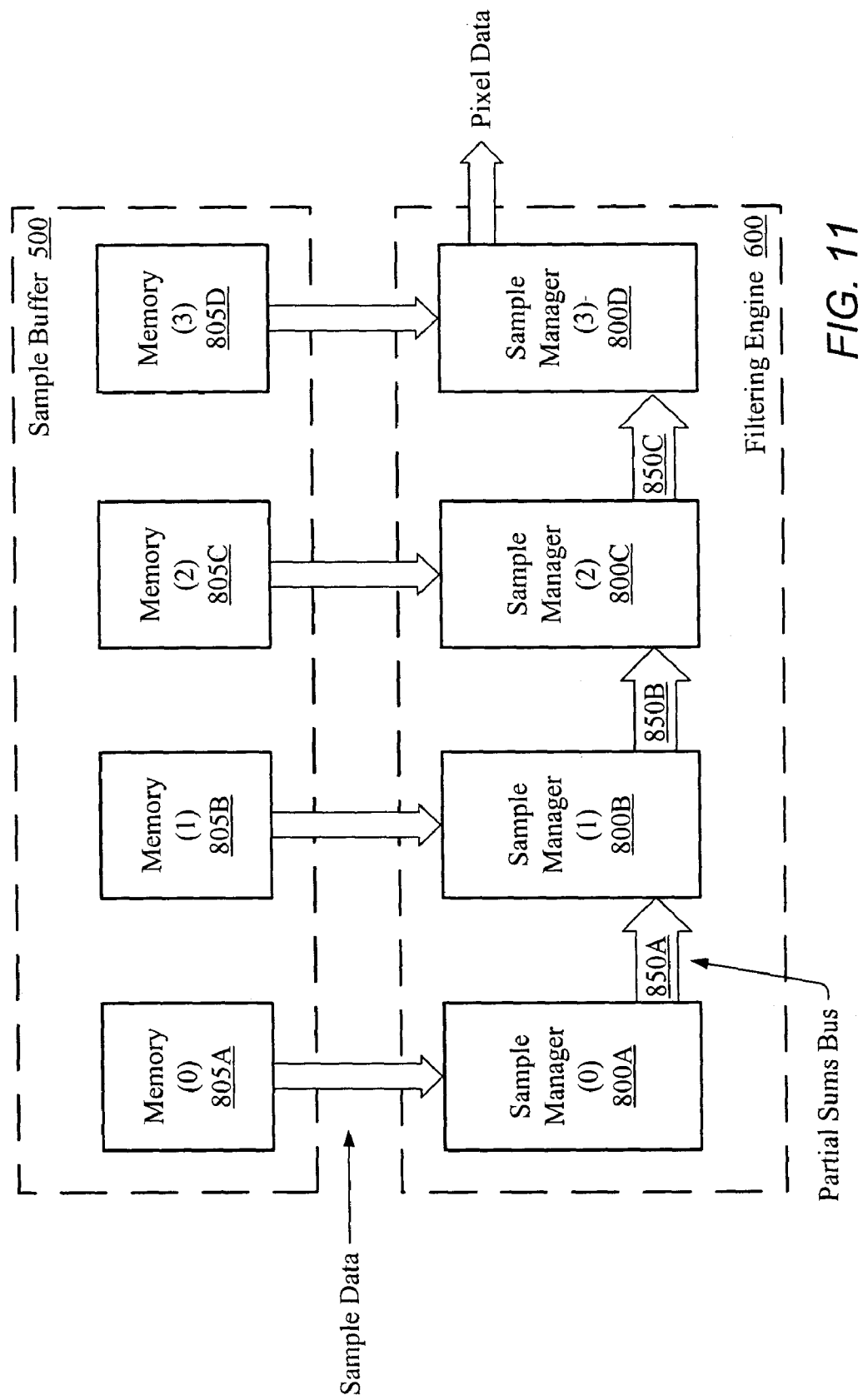
FIG. 11 provides a block diagram of one embodiment of a sample buffer 500 and filtering engine 600.

FIG. 11 illustrates one set of embodiments of a system for distributing the convolution process. Rather than having multiple convolution chips working in parallel with each chip working on a different portion of the screen, a new design utilizes a plurality of sample managers working in series. Each sample manager 800X in a chain of sample managers 800A-D performs part of the convolution process (also referred to as filtering) and sends a partial result on to the next sample manager (800X refers to any one of the sample managers 800A-D). The final sample manager in the chain completes the convolution, calculates pixel values, and adds the pixel values to a pixel buffer. Distributing the convolution process in this manner may enable a much simpler board design. Instead of a cross-bar providing communication between all of the memory chips and all of the convolution chips, this new design enables a dedicated, direct connection between a memory 805X (which may include a set of one or more memory chips) and a corresponding sample manager chip. FIG. 11 shows a chain of 4 sample managers. However, in other embodiments, a system for distributing the convolution process may include a different number of sample managers and memories, such as the 16 sample managers utilized in FIGS. 6 and 9.

Each sample manager 800X (also referred to as a filter unit) determines if any of the samples in its dedicated memory fall within a convolution kernel corresponding to a pixel. The sample manager 800X calculates a weight for each sample, a sum of weighted samples, and a sum of weights for any samples stored in its dedicated memory 805X and that are within the convolution kernel. The sums are referred to as partial results or partial sums. Since the partial sums are additive, the sample manager 800X adds the partial sums it has generated to any prior accumulated partial sums it received from the prior sample manager in the chain and sends the new accumulated partial sums to the next sample manager in the chain. After the final sample manager in the chain adds the partial sums it has generated to the accumulated partial sums it received, the final sum of weighted samples is divided by the sum of the weights. This produces a weighted average for all the samples in the convolution kernel, which is the final filtered pixel value.

The weight for a sample may be generated as a function of the distance from the location of the sample to the pixel location (the center of the convolution kernel). The weight function may be user definable and may be generated from a lookup table stored in a cache or memory.

The samples to be considered are samples that are within a convolution kernel corresponding to a pixel (typically bounded by a 5 by 5 array of pixel boxes in sample space). Those samples within the kernel that lie outside the defined filter boundary, however, may be assigned a weight of zero.

In one set of embodiments, a system for distributed convolution (or filtering) of samples includes: a sample manager 800X for calculating partial sums for its portion of the samples within a convolution kernel, where the partial sums comprise 1) a sum of weights determined for each sample location of the samples in the portion of samples and 2) a sum of weighted sample values for the portion of samples, and where the sample manager 800X adds the partial sums to any previously accumulated partial sums and outputs new accumulated partial sums; a partial sums bus (connecting the sample manager 800X to a prior sample manager in a chain of sample managers) for passing any previously accumulated partial sums to sample manager 800X; and another partial sums bus (connecting sample manager 800X to the next sample manager in the chain) for passing the new accumulated partial sums to the next sample manager. The plurality of sample managers form a chain, where each sample manager in the chain may be connected to the next sample manager by a partial sums bus, and where a last member of the chain is operable to calculate pixel values from the final accumulated partial sums.

Sample values include color values and transparency, and partial sums include partial sums for each of these parameter values.

A sample manager's portion of samples includes samples that are within the convolution kernel, but also reside in a sub-set of screen space assigned to the sample manager. The sub-sets for all sample managers may be finely interleaved across screen space. In some embodiments with 16 sample managers, each sample manager addresses one sample bin in a 4 by 4 array of sample bins and a corresponding sample bin in each repetition of the interleaved 4 be 4 array across sample space as illustrated in FIG. 5.

In some embodiments, the last sample manager in a chain may be operable to calculate parameter values for a pixel from the final accumulated sums corresponding to each sample parameter value, where the pixel values equal an accumulated sum of weighted parameter values for each sample within the convolution kernel divided by an accumulated sum of the weights determined for the location of each sample within the convolution kernel. In other embodiments, several sample managers in the chain may be enabled to calculate pixel values. In still other embodiments, many sample managers may be enabled to calculate pixel values. The section of a sample manager that is operable to calculate pixel values may be referred to as a pixel calculation unit.

A distributed convolution system may also include a plurality of memories for storing sample values, where each memory is dedicated to a unique member of the sample manager chain, each memory stores sample data for samples in the unique sub-set of screen space assigned to the corresponding sample manager, and where each sample manager may be operable to read a set of samples from it's dedicated memory (a memory may be a plurality of memory chips or memory units); a plurality of rendering units that generate samples, where each sample generated is stored in one of the memories; and one or more analog to digital video units for converting the pixel values to video output signals.

Distributed Convolution (Groups of Sample Managers)

Each sample manager may contribute to most pixel calculations if the sample buffer is finely interleaved. However, if the sample buffer is coarsely interleaved, some sample managers may be idle and waste bandwidth passing partial results without adding additional weighted samples to the partial results. For example, a particular sample manager (or group of sample managers) may be responsible for a particular section of the screen that is large with respect to the convolution kernel. When processing pixels within the particular section, other sample managers (or groups of sample managers) may be idle.

FIG. 9 illustrates one set of embodiments of an alternate architecture of sample managers interconnected in a series/parallel structure that may alleviate these processing issues. In these embodiments, the set of sample managers is divided into groups. Within a group, the sample managers operate in series, whereas the groups may operate in parallel. Sample space is tiled in a repeating pattern of an array of sections of sample space. The samples within each section are stored in the memories attached to one group of sample managers, and each section is large compared to the convolution kernel. The majority of pixel locations that reside in the interior of a section will be processed by the group of sample managers assigned to the section. Pixel locations that lie near the edge of a section may be processed by two or more groups of sample managers as illustrated in FIG. 10. This system design may result in a reduction in the amount of hardware and interconnect bandwidth utilized to implement distributed convolution.

In one set of embodiments, a system with a series/parallel structure for distributed convolution (or filtering) of samples for a pixel may include:

- N memories 805(*k*), wherein each memory (k) stores sample data for samples located within a specified sub-set of screen space, wherein (k) is an integer ranging from 0 to N−1,
- N sample managers 800 (*k*) (also referred to as filter units) arranged in M groups, wherein each sample manager (k) is coupled to a dedicated one of the memories (k),
- a first set of partial sums buses connecting each sample manager 800 k within a group to the next sample manager in the group,
- a second set of partial sums buses connecting one group of sample managers to another group of sample managers,
- where a sample manager (k) within a group is operable to:
  receive accumulated partial sums from a prior sample manager within the group or from another group of sample managers,
  read a set of samples from the corresponding memory (k), wherein the set of samples are within the specified sub-set of screen space assigned to the memory (k), and wherein the set of samples are located within a convolution kernel defined for the pixel,
  calculate partial sums for the set of samples,
  add the partial sums to the accumulated partial sums, and
  output the accumulated partial sums to the next sample manager within the group of sample managers, or to another group of sample managers,
  and wherein a last sample manager within a group may operate on the final accumulated sums to compute pixel values, after all samples within the convolution kernel have been processed.

In some embodiments, the last sample manager within a group may output the final accumulated sums to an external unit for pixel calculation.

In a particular set of embodiments, where N=16, M=4, and the 16 sub-sets of screen space are interleaved, each sample manager within a group may address one sample bin in a 2 by 2 array of sample bins that is repeated across a 16 by 16 array of sample bins. Four permutations of each of the four different 16 by 16 arrays (one for each group) may be combined to form a 64 by 64 array of sample bins that is repeated across screen space. FIG. 8 illustrates this particular interleave of sample space.

Method for Distributed Convolution

Figure 12:
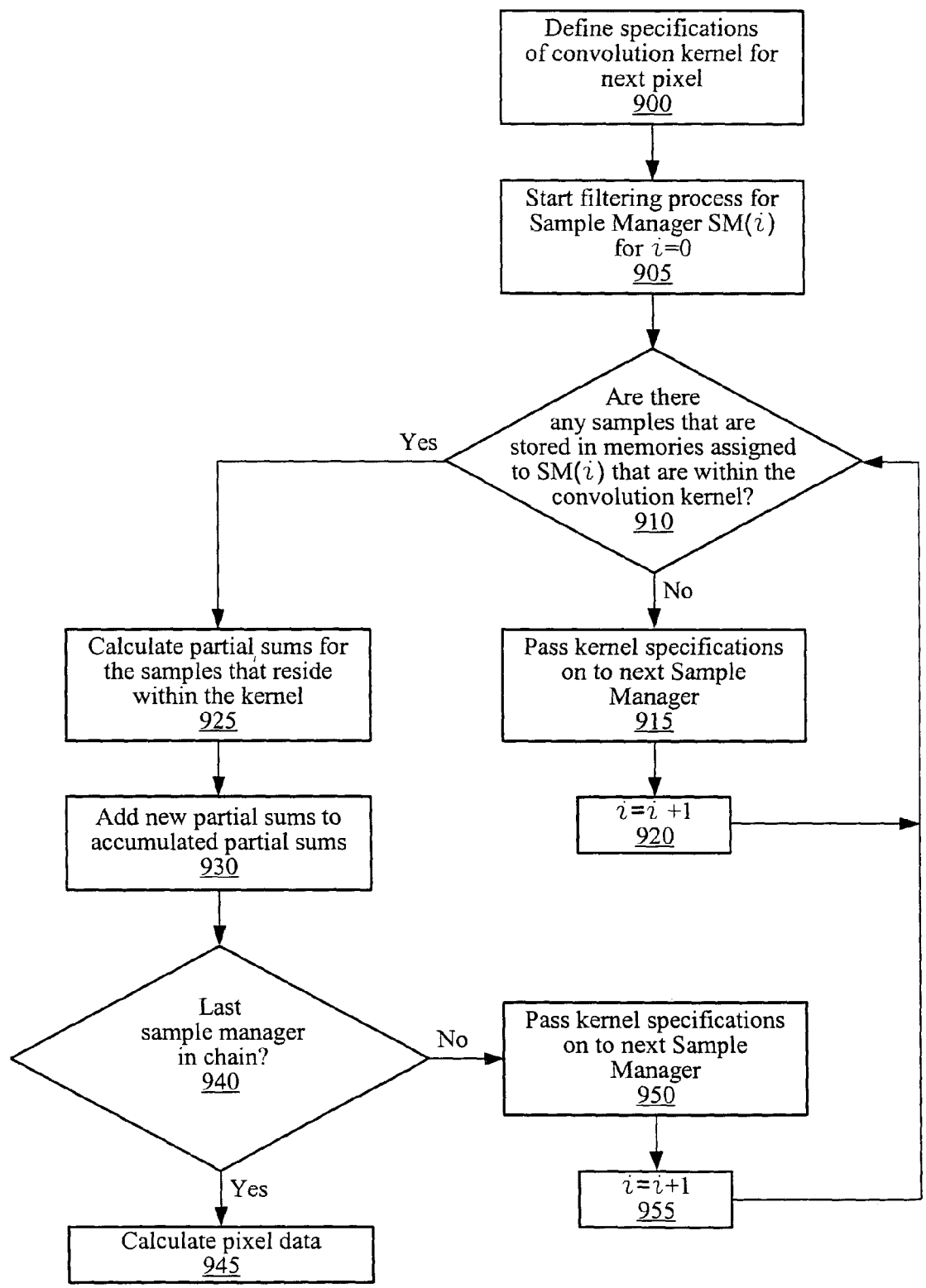
FIG. 12 provides a flow chart for a method of distributed convolution.

FIG. 12 illustrates a set of embodiments of a method for distributed convolution (or filtering) of samples that may include one or more of the operations of: defining convolution kernel parameters for a next pixel (step 900), initiating a convolution process with a first sample manager in a chain (also referred to as a sequence) (step 905), identifying a first portion of samples that are within the convolution kernel and are assigned to the first sample manager (step 910), calculating first partial sums for the first portion of samples (step 925), and sending (also referred to as passing) the first partial sums to a sequence of additional sample managers (steps 940 and 950).

Each of the additional sample managers in the chain performs one or more of the operations of: receiving accumulated partial sums from the previous sample manager in the chain (step 950), calculating new partial sums for a corresponding portion of samples located within the convolution kernel (step 925), adding the new partial sums to the accumulated partial sums (step 930), and sending the new accumulated sums to the next sample manager in the chain of sample managers (step 950). A last sample manager in the chain of sample managers may perform one or more of the operations of: receiving accumulated partial sums from the previous sample manager in the chain (step 950), calculating new partial sums for a corresponding portion of samples (step 925), adding the new partial sums to the accumulated sums to complete final sums (step 930), calculating pixel values from the final sums (step 945), and outputting the pixel values.

A convolution kernel defined for a pixel is a region in screen space contained within a defined boundary, and centered on the pixel location. Sample values include parameter values of color and transparency. Partial sums for each parameter value include 1) a sum of weighted sample values (sum of the products of each sample value and a determined weight for the location of each sample) and 2) a sum of the weights determined for the location of each sample. The weight for a location of a sample may be determined by a weight function. The weight function may have any of a variety of functional forms, including but not limited to a box filter, pyramid filter, circular filter, cone filter, Gaussian filter, and sinc filter. Pixel values equal a sum of weighted sample values (for samples within the convolution kernel) times a reciprocal of a sum of the weights determined for the locations of samples.

Each portion (k) of samples (also referred to as a specified set of samples) is within a specified screen space region (also referred to as a specified sub-set of screen space) assigned to the corresponding sample manager (k). The portion (k) of samples are read from a memory (k) dedicated to the sample manager (k). The specified screen space regions may be finely interleaved across screen space. For a system of 16 sample managers, each sample manager (k) may address one sample bin in each 4 by 4 array of sample bins repeated across screen space.

In another set of embodiments, the sample managers may be sub-divided into a plurality of groups of sample managers, each group may be a chain of sample managers, and a plurality of partial sums buses interconnect the groups. Each sample manager (k) may be assigned samples in a specified sub-set of screen space. The sub-sets may be interleaved across screen space. For a system of 4 groups of 4 sample managers in a chain, each sample manager within a group addresses a sample bin in a 2 by 2 array of sample bins and the corresponding sample bins in a 16 by 16 array that comprises repetitions of the 2 by 2 array. Four repetitions of each of the four different 16 by 16 arrays (one for each group) may be combined to form a 64 by 64 array of sample bins that is repeated across screen space.

In these embodiments, a last sample manager in each group may calculate pixel values from the final accumulated partial sums corresponding to a pixel.

Large-Kernel Convolution of Video Output from Standard Graphics Accelerators

A multi-chip system and method that utilizes a plurality of graphics pipelines to create large kernel convolved video is illustrated in one set of embodiments in FIGS. 13 through 18. Each graphics pipeline includes an industry-standard rendering unit 350 (also referred to as an OEM graphics card or as a graphics accelerator) and a video data convolve unit 650 (e.g., as suggested by FIG. 14). The video output of the rendering unit 350 may be connected to the video data convolve unit 650.

Figure 13:
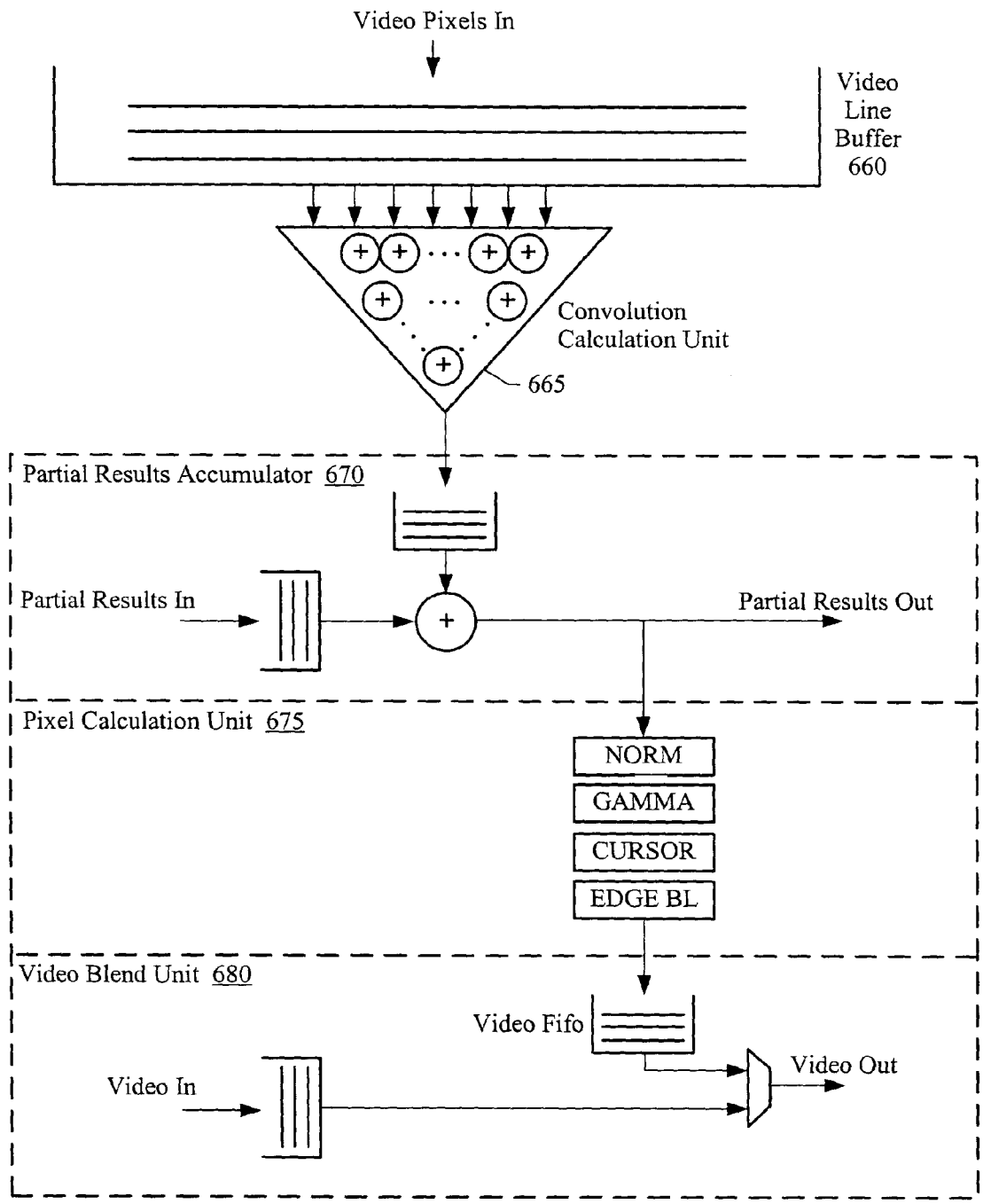
FIG. 13 provides a block diagram of one set of embodiments of a video data convolve unit 650.

FIG. 13 provides a block diagram of one set of embodiments of a video data convolve unit 650. Each video data convolve unit 650 may include five sub-sections:

1) an input sub-section that may receive video pixel data from a video output of a standard graphics rendering unit 350 and may store the video pixel data in a video line buffer 660;

2) a convolution calculation unit 665 that may calculate partial sums for sets of the video pixel data from the video line buffer 660, as part of a distributed convolution process that may involve the plurality of video data convolve units 650 (k);

3) a partial results accumulator 670 that may receive partial sums from a prior video data convolve unit 650 (k−1), may combine the received partial sums with the calculated partial sums, and may pass the new accumulated partial sums to the next video data convolve unit 650 (k+1);

4) a pixel calculation unit 675 that may calculate pixel values for a convolved pixel from the final accumulated partial sums; and (in a system with a tiled topology or a tiled and stacked topology as discussed below)

5) a video blend unit 680 that may receive convolved pixels from a prior video data convolve unit 650 (k−1) in the chain (or 650 (k−j) for a stacked and tiled topology discussed below), may combine the received pixels with calculated pixels (ordered by screen position) and may output the ordered stream of pixels.

Video Data Convolution Utilizing a Stacked Topology

Figure 14:
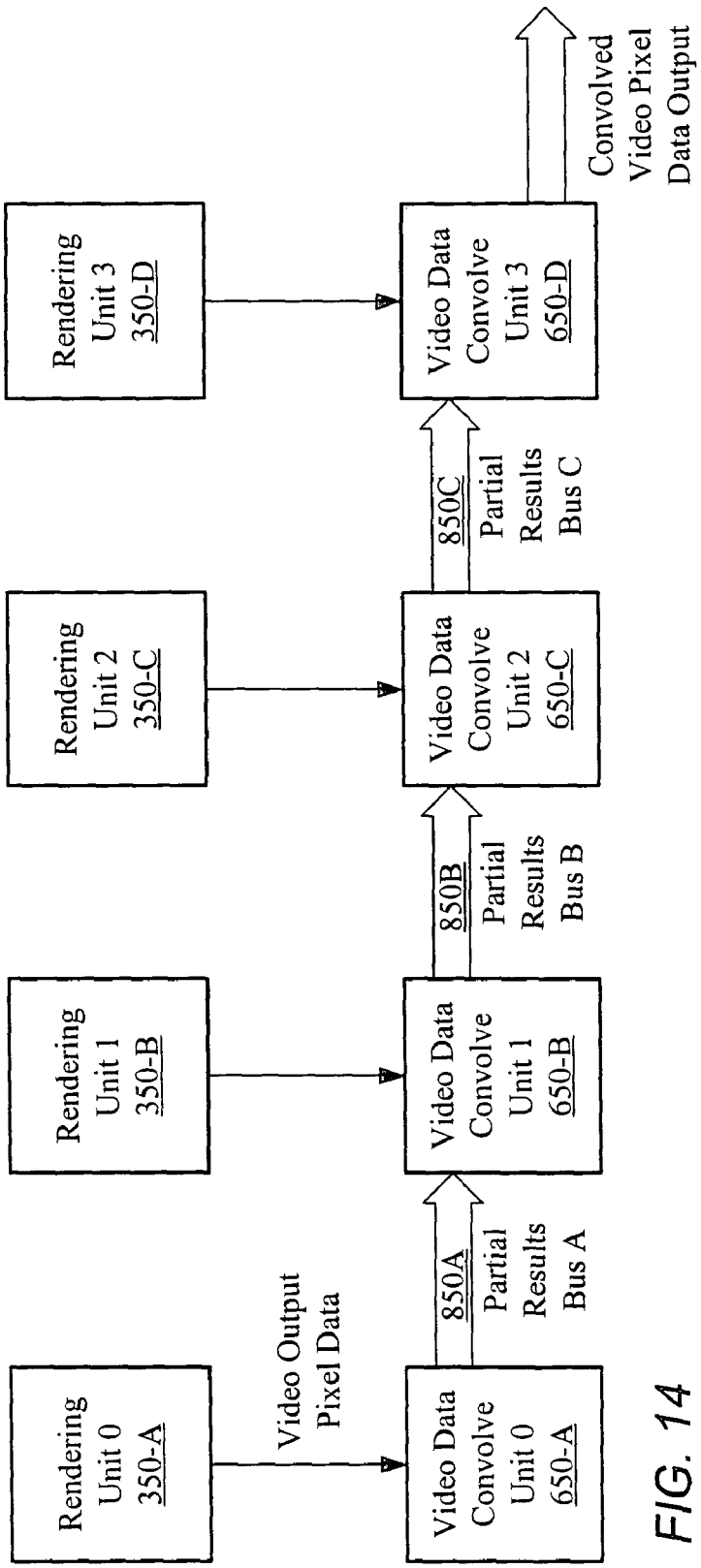
FIG. 14 provides a block diagram of one set of embodiments of a system to convolve video data for a stacked topology.

A system for distributed convolution of digital video data utilizing a stacked topology may include N graphics pipelines. Each geometric primitive is sent to every graphics pipeline. Each rendering unit 350 (k) is assigned a different jitter value (a vector sub-pixel displacement) (where k represents a member of a set of N identifying symbols such as A, B, C, ... or 0, 1, 2, ... ). Each rendering unit 350 (k) generates a video pixel for the location of each screen pixel (plus the assigned jitter value). Each video data convolve unit 650 (k) is connected to a different rendering unit 350 (k) and the N video data convolve units may act together to perform a distributed convolution on the video pixels received from the N rendering units. Consequently, the N rendering units 350 (k) provide N different video pixels per each convolved video pixel location. This is equivalent to a process that generates N samples per sample bin and convolves a pixel from a set of samples contained within a corresponding convolution kernel. FIG. 14 provides a block diagram of one set of embodiments of a stacked topology system with four graphics pipelines to render pixels and convolve the video data.

A system for distributed convolution of stacked digital video data may include one or more of: 1) a plurality of rendering units 350 (k); 2) a plurality of video data convolve units 650 (k) connected in a chain, where each video data convolve unit 650 (k) is connected to a video output of a dedicated rendering unit 350 (k); 3) one or more partial results buses 850 (k), where each bus connects a video data convolve unit in the chain to a next video data convolve unit in the chain; and (in some embodiments) 4) an interface between the dedicated graphics rendering unit 350 (k) and the video data convolve unit 650 (k) to convert the format of the video pixel data to a digital data format utilized by the video data convolve unit 650 (k).

Each video data convolve unit 650 (k) may include one or more of: 1) a video line buffer 660 to store lines of video pixels received from the video output of the rendering unit 350 (k), 2) a convolution calculation unit 665 to calculate partial convolution sums for a set of the video pixels that are located within a convolution kernel corresponding to a convolved pixel location, 3) a partial results accumulator 670 to receive accumulated partial convolution sums (also referred to as partial results) from a prior video data convolve unit in the chain (unless the video data convolve unit is the first video data convolve unit in the chain), add the calculated partial convolution sums to corresponding partial sums received, and output the new accumulated partial convolution sums to the next video data convolve unit in the chain (unless the video data convolve unit is the last video data convolve unit in the chain), 4) a pixel value calculator 675 that is operable in the last video data convolve unit in the chain to determine values for a convolved pixel from the final accumulated partial sums, and 5) a video blend unit 680 that is operable in the last video data convolve unit in the chain to output convolved pixels.

Partial convolution sums include 1) a sum of weights determined for locations of each video pixel in the set of video pixels and 2) a sum of weighted video pixel values for the set of video pixels. There is a set of partial convolution sums for each parameter value specified for each pixel (e.g., parameter values such as the color values red, green, and blue). The value for each convolved pixel parameter equals the sum of weighted video pixel values for the parameter divided by the sum of weights.

Figure 15A:
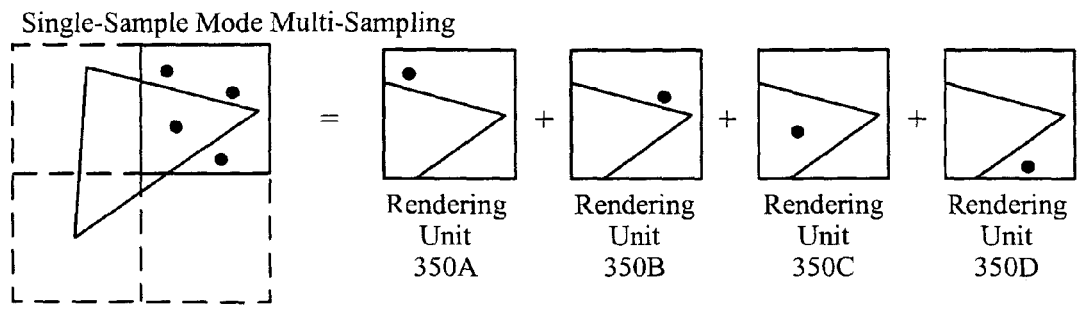
FIG. 15a illustrates single-sample mode multi-sampling utilizing rendering units 350 configured to render one sample per sample bin.
Figure 15B:
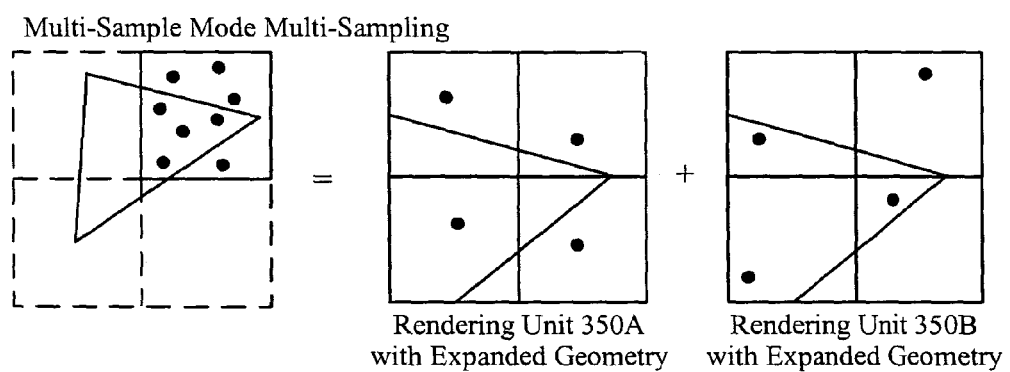
FIG. 15b illustrates multi-sample mode multi-sampling for processing expanded primitives to achieve four samples per sample bin utilizing rendering units configured to render one sample per sample bin.

FIG. 15a illustrates single-sample mode multi-sampling utilizing each rendering unit 350 (k) configured to render one sample per sample bin. FIG. 15b illustrates multi-sample mode multi-sampling for rendering expanded primitives to achieve four samples per sample bin per rendering unit, utilizing rendering units configured to render one sample per sample bin. The primitives are expanded by equal integer factors in both the x and y dimensions. This method is able to generate 4, 9, 16, ... m*m samples per sample bin, where m is the expansion factor. The video data convolve units in these embodiments are configured to reduce the location values by the expansion factor as part of the convolution process to restore the original scale of the image to be displayed.

Video Data Convolution Utilizing a Tiled Topology

A system for convolution of digital video data utilizing a tiled topology may include N graphics pipelines. Each graphics pipeline may be assigned a different portion of screen space and process those geometric primitives (or clipped geometric primitives) that reside within the assigned portion. Frustum culling may be performed on a host computer to sort the geometric primitives by screen portions and send each primitive to the corresponding pipeline. Those primitives that overlap a screen portion boundary may be sent to both portions or subdivided along the boundary. Each rendering unit

350 (*k*) generates a video pixel for each screen pixel location within the assigned portion (where k represents a set of N identifying symbols such as A, B, C, . . . or 0, 1, 2, . . . ). Each video data convolve unit 650 (*k*) is connected to a video output of rendering unit 350 (*k*) and convolves the video data it receives into convolved pixels. The video data convolve units 650 (*k*) are chained together by partial video buses 880 (*k*) as suggested by FIG. 16.

Figure 16:
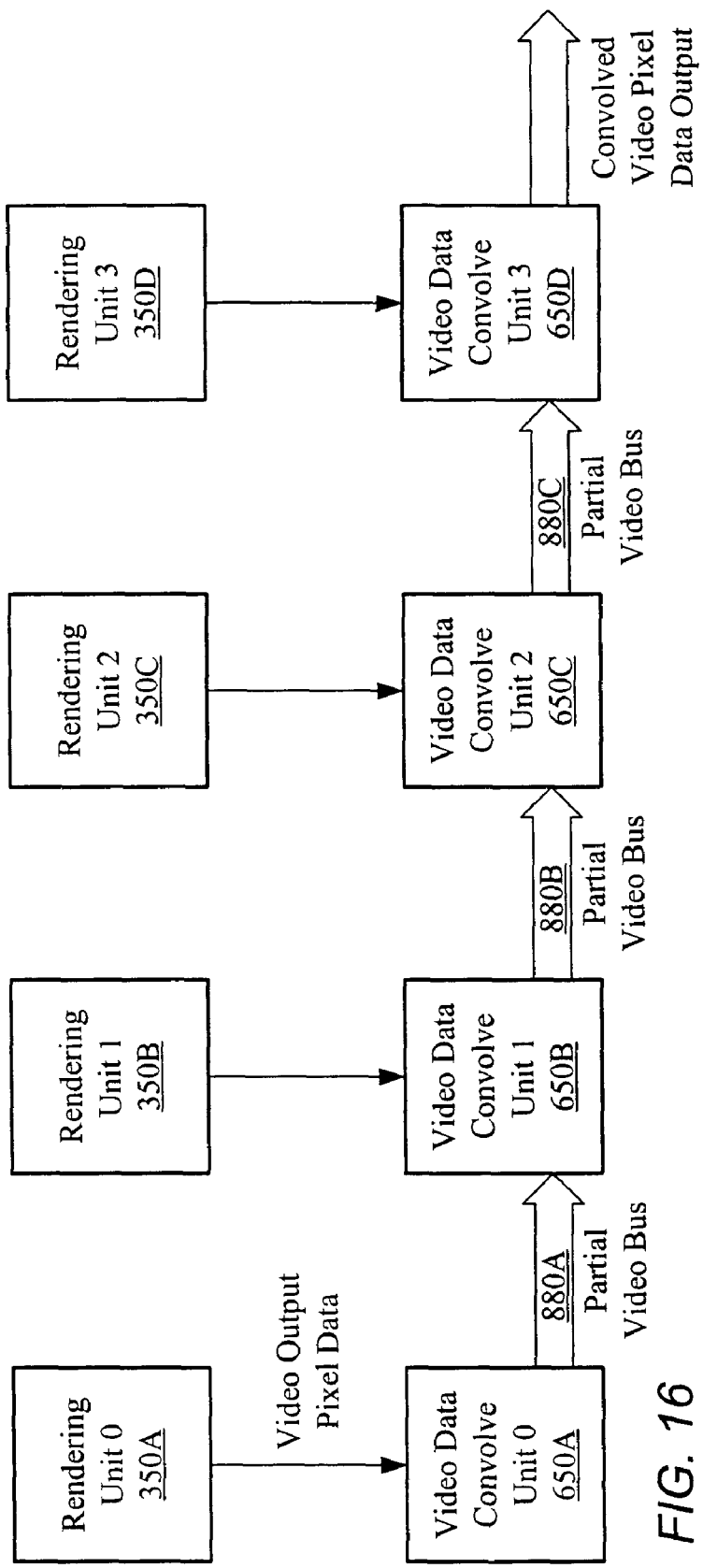
FIG. 16 provides a block diagram of one set of embodiments of a system to convolve video data for a tiled topology.

FIG. 16 provides a block diagram of one set of embodiments of a tiled topology system with four graphics pipelines to render pixels and convolve video data. The convolved video data generated by a first video data convolve unit 650A in the chain is passed to the second video data convolve unit 650B via a partial video bus 880A. The convolved video data generated by the second video data convolve unit 650B in the chain is combined with convolved video data received from the first video data convolve unit 650A, ordered by screen position, and output to the third video data convolve unit 650C. The last video data convolve unit 650D in the chain outputs a convolved video data stream for display.

A system for convolution of tiled digital video data may include one or more of: 1) a plurality of rendering units 350 (*k*); 2) a plurality of video data convolve units 650 (*k*) connected in a chain, where each video data convolve unit 650 (*k*) is connected to a video output of rendering unit 350 (*k*); 3) one or more partial video buses 880 (*k*), where each bus connects a video data convolve unit in the chain to a next video data convolve unit in the chain; and (in some embodiments) 4) an interface between the dedicated graphics rendering unit 350 (*k*) and the video data convolve unit 650 (*k*) to convert the format of the video pixel data to a digital data format utilized by the video data convolve unit 650 (*k*).

Each video data convolve unit 650 (*k*) may include one or more of: 1) a video line buffer 660 to store lines of video pixels received from the video output of the rendering unit 350 (*k*), 2) a convolution calculation unit 665 to calculate convolution sums for a set of the video pixels that are located within a convolution kernel corresponding to the location of a convolved video pixel, 3) a pixel value calculator 675 that is operable to determine values for a convolved pixel from the convolution sums, and 4) a video blend unit 680 that is operable to receive convolved video pixels from a prior video data convolve unit and output a stream of convolved video pixels that is a combination of the received and generated video pixels ordered by screen location.

Convolution sums include 1) a sum of weights determined for locations of each video pixel in the set of video pixels and 2) one or more sums of weighted video pixel values for the set of video pixels. There is a convolution sum for each parameter value specified for each pixel (such as the color values red, green, and blue). The value for each convolved pixel parameter equals the sum of weighted video pixel values for the parameter divided by the sum of weights.

FIG. 15*a* illustrates single-sample mode multi-sampling utilizing each rendering unit 350 (*k*) configured to render one sample per sample bin. FIG. 15*b* illustrates multi-sample mode multi-sampling for rendering expanded primitives to achieve four samples per sample bin per rendering unit 350 (*k*), utilizing rendering units configured to render one sample per sample bin. The primitives are expanded by equal integer factors in both the x and y dimensions. This method is able to generate 4, 9, 16, . . . m*m samples per sample bin, where m is the expansion factor. The video data convolve units in these embodiments may also be configured to reduce the location values by the expansion factor as part of the convolution process to achieve the original intended geometry of the rendered image. The tile boundaries would be expanded by the same expansion factor.

Video Data Convolution Utilizing a Stacked and Tiled Topology

A system for convolution of digital video data utilizing a combination of stacked and tiled topology may include N graphics pipelines. The graphics pipelines may be organized into groups. At least one group has a plurality of pipelines, while remaining groups may include one or more pipelines. For groups with more than one pipeline, the pipelines within the group utilize a stacked topology and distributed convolution. The groups are interconnected with a tiled topology. Each group is assigned a portion of screen space and processes geometric primitives (or clipped geometric primitives) that reside within the assigned portion. Frustum culling may be utilized to sort the geometric primitives by screen portions and send each primitive to the corresponding pipeline. Those primitives that overlap a screen portion boundary may be sent to both portions or subdivided along the boundary. Each pipeline within a group receives the same geometric primitives. Each rendering unit 350 (*k*) within a group is assigned a different jitter value (where k represents a set of N identifying symbols such as A, B, C, . . . or 0, 1, 2, . . . ). The video data convolve units 650 (*k*) within a group perform a distributed convolution on the video pixels received from their dedicated rendering units 350 (*k*). Consequently, each group with two or more pipelines generates a plurality of jittered video pixels for each screen pixel location within the assigned portion of screen space.

Figure 17:
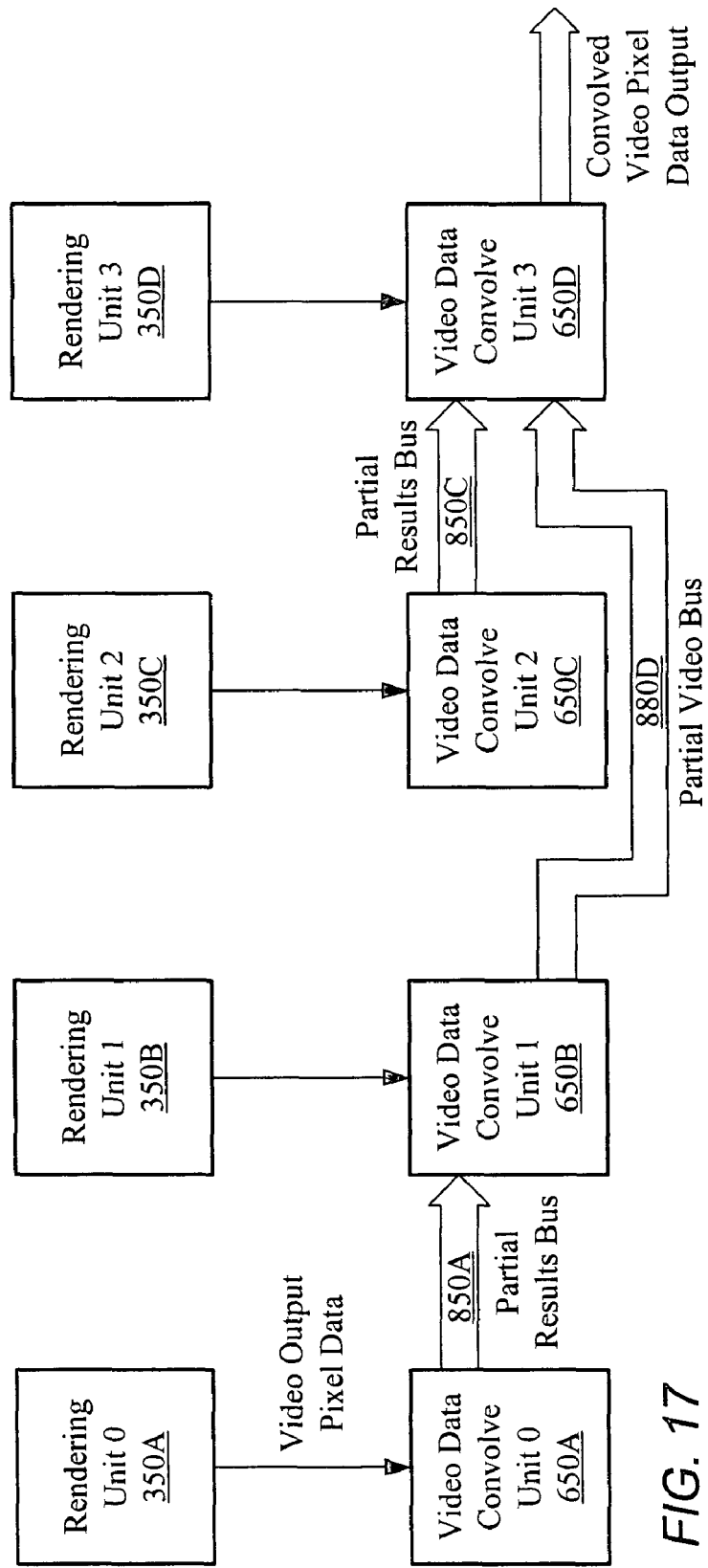
FIG. 17 provides a block diagram of one set of embodiments of a system to convolve video data for a combination of stacked and tiled topology.

FIG. 17 provides a block diagram of one set of embodiments of a tiled and stacked topology system with four graphics pipelines organized in two groups to render pixels and convolve video data. The last video data convolve unit 650B,D in each group may be chained together by a partial video bus 880D. The convolved video data generated by the first group in the chain is passed to the second group via the partial video bus 880D. The convolved video data generated by the second group in the chain is combined with convolved video data received from the first group, ordered by screen position, and output for display.

A system for convolution of digital video data (utilizing a combination of stacked and tiled topology) may include one or more of: 1) a plurality of rendering units 350 (*k*); 2) a plurality of video data convolve units 650 (*k*) connected in a chain, where each video data convolve unit 650 (*k*) is connected to a video output of a dedicated rendering unit 350 (*k*); 3) one or more partial results buses 850 (*k*), where each bus connects a video data convolve unit within a group to a next video data convolve unit within the group; 4) one or more partial video buses 880 (*k*), where each partial video bus connects a last video data convolve unit of a group to the last video data convolve unit of the next group within the chain; and (in some embodiments) 5) an interface between the dedicated graphics rendering unit 350 (*k*) and the video data convolve unit 650 (*k*) to convert the format of the video pixel data to a digital data format utilized by the video data convolve unit 650 (*k*).

Each video data convolve unit 650 (*k*) may include one or more of: 1) a video line buffer 660 to store one or more lines of video pixels received from the video output of the rendering unit 350 (*k*), 2) a convolution calculation unit 665 to calculate partial convolution sums for a set of the video pixels that are located within a convolution kernel, 3) a partial results accumulator 670 to receive accumulated partial convolution sums (also referred to as partial results) from a prior video data convolve unit within a group (unless the video data convolve unit is the first video data convolve unit in the group), add the calculated partial convolution sums to corresponding received partial sums, and output the new accumulated partial convolution sums to the next video data convolve unit in the group (unless the video data convolve unit is the last video data convolve unit in the group), 4) a pixel value calculator 675 that is operable in the last video data convolve unit in a group to generate values for a convolved pixel from the final accumulated partial sums, and 5) a video blend unit 680 that may receive convolved video pixels from a prior group's last video data convolve unit and output a stream of convolved video pixels that is a combination of the received and generated convolved video pixels ordered by screen location.

Partial convolution sums include 1) a sum of weights determined for locations of each video pixel in the set of video pixels and 2) a sum of weighted video pixel values for the set of video pixels. There is a set of partial convolution sums for each parameter value specified for each pixel (such as the color values red, green, and blue). The value for each convolved pixel parameter equals the sum of weighted video pixel values for the parameter divided by the sum of weights.

FIG. 15*a* illustrates single-sample mode multi-sampling utilizing each rendering unit 350 ($k$) configured to render one sample per sample bin. FIG. 15*b* illustrates multi-sample mode multi-sampling for rendering expanded primitives to achieve four samples per sample bin per rendering unit 350 ($k$), utilizing rendering units configured to render one sample per sample bin. The primitives are expanded by equal integer factors in both the x and y dimensions. This method is able to generate 4, 9, 16, . . . m*m samples per sample bin, where m is the expansion factor. The video data convolve units in these embodiments may also be configured to reduce the location values by the expansion factor as part of the convolution process to achieve the original intended geometry of the rendered image. The tile boundaries may be expanded by the same expansion factor.

Method for Convolution of Video Output from Standard Graphics Accelerators

Figure 18:
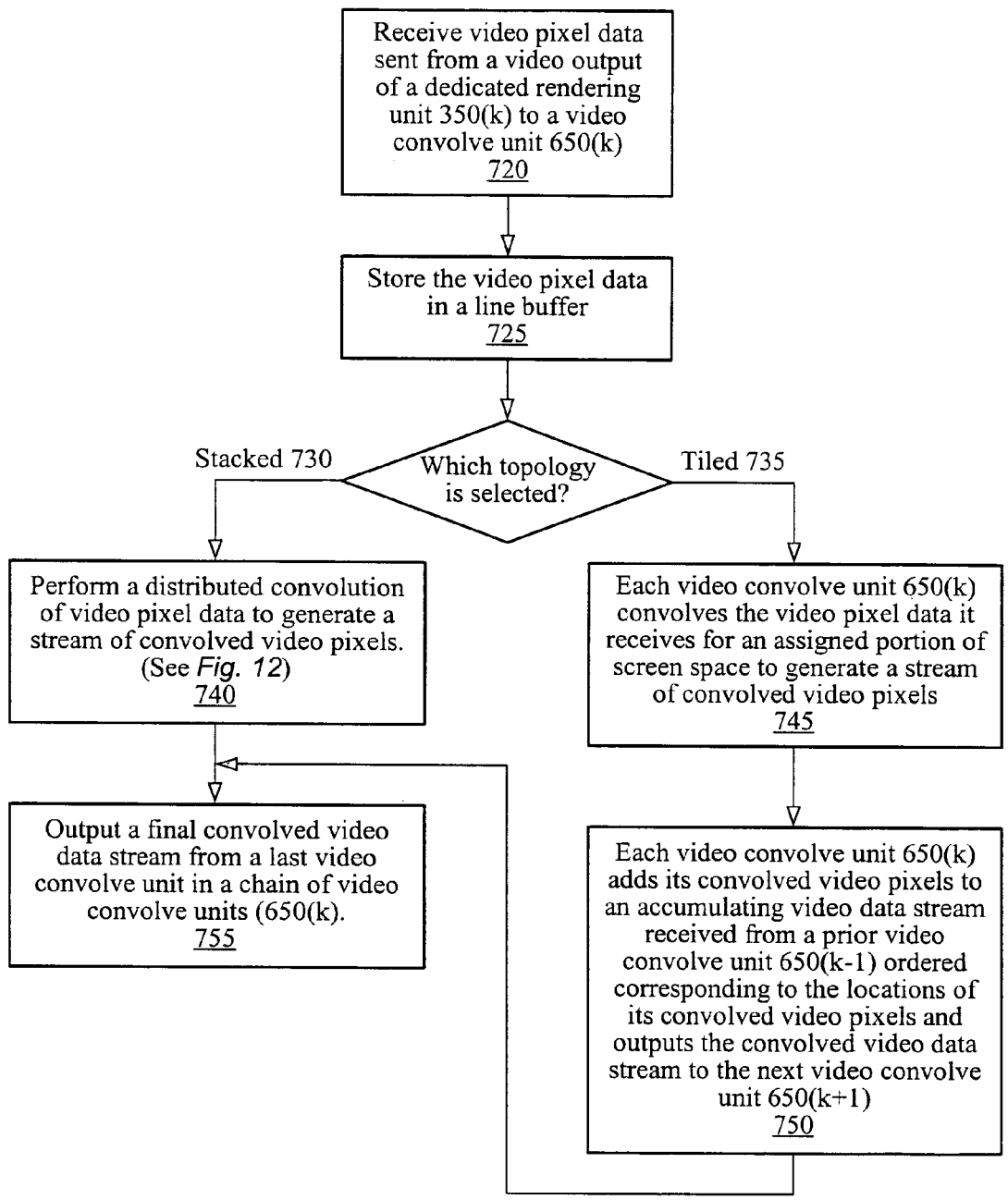
FIG. 18 provides a flow chart of a method for the convolution of video output data for a system with either a stacked or a tiled topology.

FIG. 18 provides a flow chart for one set of embodiments of a method for the convolution of video output data from the rendering units to generate convolved video output for a system with either a stacked and/or a tiled topology. For systems with a stacked topology, a method involving distributed convolution may be utilized that may include one or more of:

specifying a different jitter value or jitter pattern for each rendering unit 350 ($k$);

sending vertex data for each geometric primitive to each rendering unit 350 ($k$); rendering video pixels for each jittered pixel location that lies within a geometric primitive;

outputting the video pixels to a video data convolve unit 650 ($k$);

interfacing the video data output from the rendering unit 350 ($k$) to the digital data format utilized in the video data convolve unit 650 ($k$);

storing the video pixel data in a video line buffer 660;

performing a partial convolution in each video data convolve unit 650 ($k$) as part of a distributed process to determine values for a convolved pixel by calculating partial convolution sums for the pixels in the line buffer 660 that are located within a convolution kernel corresponding to the location of the convolved pixel;

adding the partial convolution sums to any corresponding accumulated partial convolution sums received from a prior video data convolve unit 650 ($k-1$) in the chain to form new accumulated partial convolution sums, unless the video data convolve unit 650

($k$) is the first video data convolve unit in the chain;

sending the new accumulated partial convolution sums to the next video data convolve unit 650 ($k+1$) in the chain, unless the video data convolve unit 650 ($k$) is the last video data convolve unit in the chain;

determining values for a convolved pixel from the final accumulated partial convolution sums in the last video data convolve unit 650 in the chain;

storing the convolved pixel values in a video output buffer in the last video data convolve unit 650 in the chain; and outputting the convolved pixel data from the last video data convolve unit 650 in the chain.

Partial convolution sums include 1) a sum of weights determined for locations of each video pixel in the set of video pixels and 2) a sum of weighted video pixel values for the set of video pixels. There is a set of partial convolution sums for each parameter value specified for each pixel (such as the color values red, green, and blue). The value for each convolved pixel parameter equals the sum of weighted video pixel values for the parameter divided by the sum of weights.

Note that each rendering unit 350 ($k$) renders video pixels for each primitive and may render values for every pixel in screen space. In some embodiments, each rendering unit 350 ($k$) may determine video pixel data for primitives that are geometrically expanded in both x and y dimensions by an integer factor of 2 or more. Convolved pixel values are determined from the geometrically expanded pixel data and then assigned to convolved pixel locations determined by reducing the expanded locations by the same integer factor to achieve the original intended geometry in the displayed image. This method is referred to as multi-sample mode multi-sampling.

FIG. 15*a* illustrates single-sample mode multi-sampling utilizing each rendering unit 350 ($k$) to render one sample per sample bin. FIG. 15*b* illustrates multi-sample mode multi-sampling for rendering expanded primitives to achieve four samples per sample bin per rendering unit 350 ($k$), utilizing rendering units configured to render one sample per sample bin. The primitives are expanded by equal integer factors in both the x and y dimensions. This method may generate 4, 9, 16, . . . m*m samples per sample bin, where m is the expansion factor.

In some embodiments of systems with a tiled topology, a method for convolution of tiled digital video data in a plurality of video data convolve units 650 ($k$) connected in a chain may include one or more of:

receiving video pixel data from a dedicated rendering unit 350 ($k$) for a specified portion of screen space (each graphics rendering unit 350 ($k$) in a system with a tiled topology renders video pixels for a different portion of screen space);

storing the video pixel data in a video line buffer 660 within video data convolve unit 650($k$);

determining values for a convolved pixel by convolving the video pixels in the line buffer 660 that are located within a convolution kernel corresponding to the location of the convolved pixel;

storing the convolved pixel in a convolved pixel buffer;

combining the convolved pixels in the pixel buffer with convolved pixels received from a prior video data convolve unit 650 ($k-1$) so that the combined convolved pixels are ordered by their locations in a line of screen space, unless the video data convolve unit 650 ($k$) is the first video data convolve unit in the chain;

sending the combined convolved pixels to the next video data convolve unit 650 (*k*+1) in the chain, unless the video data convolve unit 650 (*k*) is the last video data convolve unit in the chain; and outputting (from a last video data convolve unit in the chain) the combined and ordered convolved video pixels to a display.

Numerous variations and modifications will become apparent to those skilled in the art once the above disclosure is fully appreciated. It is intended that the following claims be interpreted to embrace all such variations and modifications.

What is claimed is:

1. A method for distributed convolution of stacked digital video data in a plurality of video data convolve units connected in a chain comprising (for each video data convolve unit):
   receiving video pixel data from a video output of a dedicated rendering unit; storing the video pixel data in a video line buffer;
   performing a partial convolution as part of a distributed process to determine values for a convolved pixel by calculating partial convolution sums for the pixels in the line buffer that are located within a convolution kernel corresponding to the location of a convolved pixel;
   adding the partial convolution sums to any corresponding accumulated partial convolution sums received from a prior video data convolve unit in the chain to form new accumulated partial convolution sums, unless the video data convolve unit is the first video data convolve unit in the chain;
   sending the new accumulated partial convolution sums to the next video data convolve unit in the chain, unless the video data convolve unit is the last video data convolve unit in the chain;
   specifying a different jitter value or jitter pattern for each rendering unit; sending vertex data for each geometric primitive to each rendering unit; rendering pixel values for each jittered pixel location that lies within a geometric primitive; and
   outputting the pixel values.

2. A method for distributed convolution of stacked digital video data in a plurality of video data convolve units connected in a chain comprising (for each video data convolve unit):
   receiving video pixel data from a video output of a dedicated rendering unit; storing the video pixel data in a video line buffer;
   performing a partial convolution as part of a distributed process to determine values for a convolved pixel by calculating partial convolution sums for the pixels in the line buffer that are located within a convolution kernel corresponding to the location of a convolved pixel;
   adding the partial convolution sums to any corresponding accumulated partial convolution sums received from a prior video data convolve unit in the chain to form new accumulated partial convolution sums, unless the video data convolve unit is the first video data convolve unit in the chain;
   sending the new accumulated partial convolution sums to the next video data convolve unit in the chain, unless the video data convolve unit is the last video data convolve unit in the chain; and
   further comprising for the last video data convolve unit in the chain:
   determining parameter values for a convolved pixel from the final accumulated partial convolution sums, storing the convolved pixel values in a video output buffer, and outputting the convolved pixel data.

3. The method of claim 2, wherein determining parameter values for a convolved pixel comprises (for each parameter) dividing the final accumulated sum of weighted video pixel values for the parameter by a sum of weights, wherein the weights are determined for locations of each video pixel that is within the convolution kernel.

4. A method for distributed convolution of stacked digital video data in a plurality of video data convolve units connected in a chain comprising (for each video data convolve unit):
   receiving video pixel data from a video output of a dedicated rendering unit; storing the video pixel data in a video line buffer;
   performing a partial convolution as part of a distributed process to determine values for a convolved pixel by calculating partial convolution sums for the pixels in the line buffer that are located within a convolution kernel corresponding to the location of a convolved pixel;
   adding the partial convolution sums to any corresponding accumulated partial convolution sums received from a prior video data convolve unit in the chain to form new accumulated partial convolution sums, unless the video data convolve unit is the first video data convolve unit in the chain;
   sending the new accumulated partial convolution sums to the next video data convolve unit in the chain, unless the video data convolve unit is the last video data convolve unit in the chain; and
   wherein the video pixel data from each rendering unit are determined for primitives that are geometrically expanded in both x and y dimensions by an integer factor of 2 or more; and wherein convolved pixel values are determined from the geometrically expanded pixel data and then assigned to convolved pixel locations determined by reducing the expanded locations by the same integer factor.

* * * * *

UNITED STATES PATENT AND TRADEMARK OFFICE
CERTIFICATE OF CORRECTION

| | | |
|---|---|---|
| PATENT NO. | : 7,737,994 B1 | Page 1 of 1 |
| APPLICATION NO. | : 10/673088 | |
| DATED | : June 15, 2010 | |
| INVENTOR(S) | : Michael A. Wasserman et al. | |

It is certified that error appears in the above-identified patent and that said Letters Patent is hereby corrected as shown below:

In column 2, line 43, delete "achieve," and insert -- achieve --, therefor.

In column 8, line 32, delete "pixelclocks" and insert -- pixel clocks --, therefor.

In column 10, line 65-67, delete "Since...................them." and insert the same on Col. 10, Line 64, after "ring." as a continuation of the same paragraph.

In column 14, line 32, delete "boundary," and insert -- boundary --, therefor.

In column 15, line 39, after "below)" insert -- ; --.

In column 20, line 4, delete "(k).......................chain;" and insert the same on Col. 20, Line 3, after "650" as a continuation of the same paragraph.

Signed and Sealed this
Twelfth Day of July, 2011

David J. Kappos
*Director of the United States Patent and Trademark Office*